United States Patent [19]

Elson

[11] Patent Number: 5,671,416
[45] Date of Patent: Sep. 23, 1997

[54] APPARATUS AND A METHOD FOR SEARCHING AND MODIFYING SOURCE CODE OF A COMPUTER PROGRAM

[76] Inventor: David Elson, 3676 De Soto Ave., Santa Clara, Calif. 95051

[21] Appl. No.: 393,710

[22] Filed: Feb. 24, 1995

[51] Int. Cl.$^6$ ............................................. G06F 9/45
[52] U.S. Cl. ..................... 395/702; 364/280.4; 395/705
[58] Field of Search .................................. 395/700, 705, 395/702; 364/280.4, 973

[56] References Cited

U.S. PATENT DOCUMENTS

| | | | |
|---|---|---|---|
| 4,931,928 | 6/1990 | Greenfeld | 395/600 |
| 5,224,038 | 6/1993 | Bespalko | 364/419.1 |
| 5,374,928 | 12/1994 | Moore et al. | 364/67 |
| 5,386,570 | 1/1995 | Lindhorst | 395/700 |
| 5,530,957 | 6/1996 | Koenig | 395/600 |

OTHER PUBLICATIONS

Simpson, "Mastering Wordperfect 5.1 and 5.2 for Windows", Sybex, pp. 34–35 1993.
Campbell, "dBase IV 1.5 Handbook", Borland Bantam, pp. 119–120, 127–128, 148–151, 156–159, 770–771, 788 Jun. 1992.
Webster's II New Riverside Dictionary, p. 856 1988.
Kochan, "Programming in C", Hayden Books, pp. 15–16 1988.
Ralston, "Van Nostrand's Encyclopedia of Computer Science and Engineering", 2nd Edition, pp. 824–831 and 1105–1106 1984.

Primary Examiner—Mark R. Powell
Assistant Examiner—Lawrence O. Richardson
Attorney, Agent, or Firm—Paul F. Schenck

[57] ABSTRACT

An apparatus and a method for searching through a parse tree of a source code of a computer program use a new type of parse tree including all computational as well as non-computational entries. The new type of parse tree in combination with a new query language and query language processor provide for fast and easy search through a parse tree for the occurrences of one or more selected terms in the new type of parse tree, and for easy generation of new source code differing from the original source code by modifications specified in the query language statements.

The principles of the new method for searching is also applicable on other types of structured data, such as simulation programs and multi-level computer-aided-engineering documents.

20 Claims, 21 Drawing Sheets

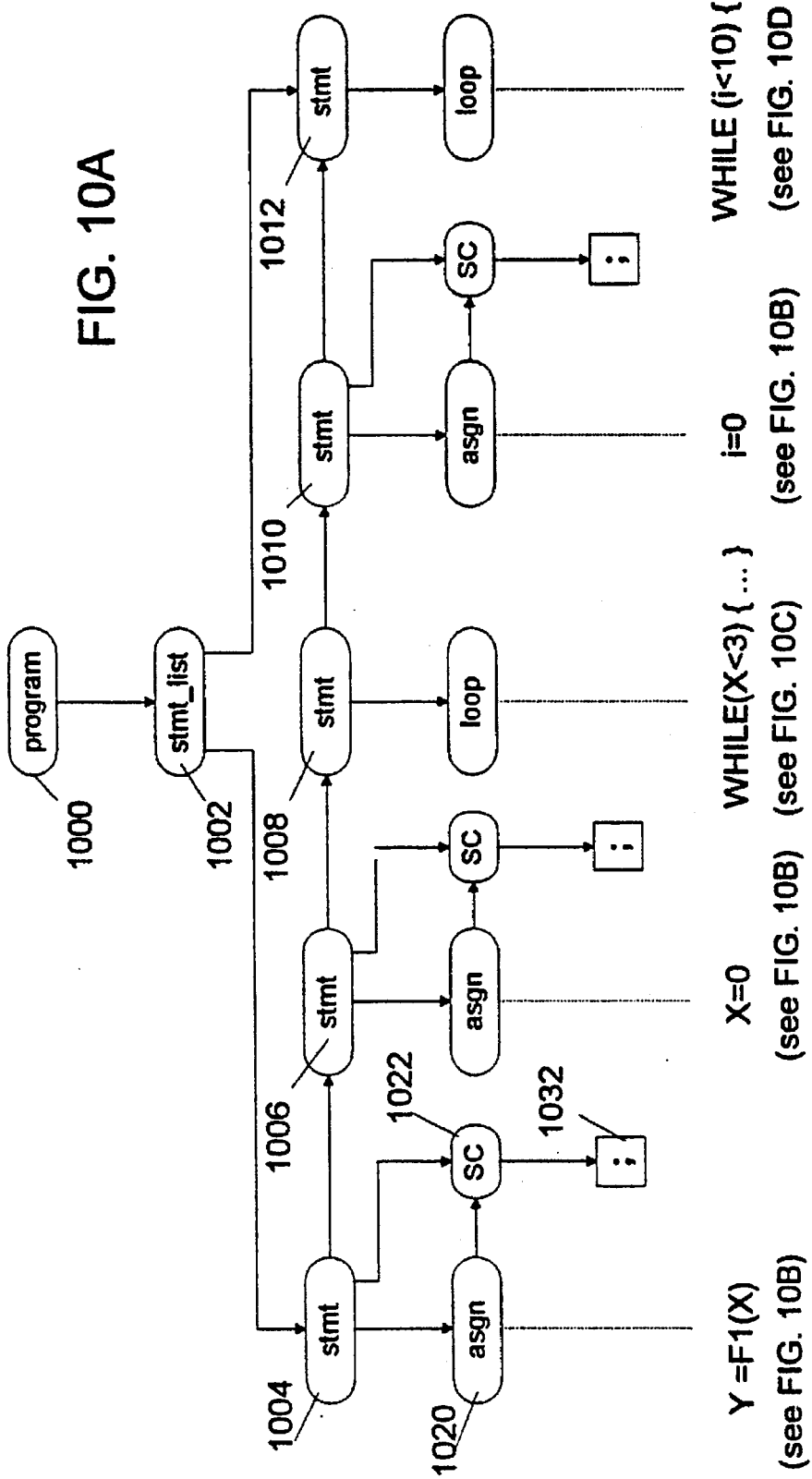

Original:
    D = SUM (A,B,C)
Definitions:
    SUM3(X,Y,Z) :X,ADD2(Y,Z)
    ADD2(X,Y) :ADD1(X),ADD1(Y)
    ADD1(X) :+X
FIG. 13A
Internal:
    SUM3(X,Y,Z) :XADD2(Y,Z)
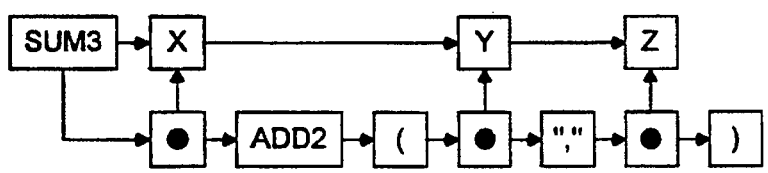
FIG. 13B
ADD2(X,Y):ADD1(X)ADD1(Y)
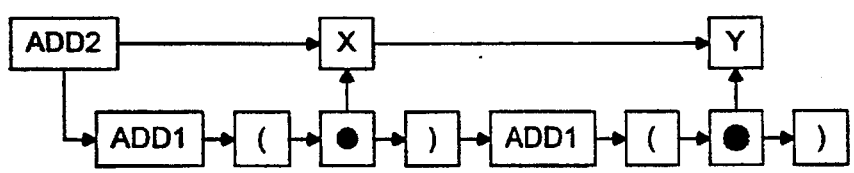
FIG. 13C
ADD1(X):+X
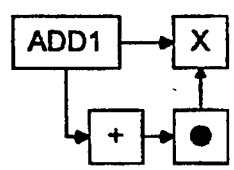
FIG. 13D
SUM3(X,Y,Z):XADD2 (Y,Z)
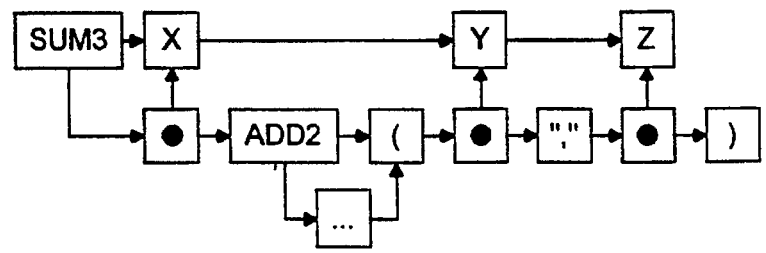
FIG. 13E SUM3(A+B, f(c), g(D,E))

Reference:
SUM3(A+B, f(c), g(D,E))

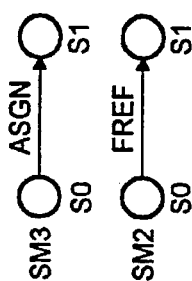
FIG. 16D
| NODE | STATE SM1 | STATE SM2 | STATE SM2 |
|---|---|---|---|
| N0 | S0 | S0 | S0 |
| N1 | S1 | . | . |
| N4 | . | . | . |
| N1 | S1 | . | . |
| N5 | S2 | . | . |
| N8 | . | . | . |
| N8 | S2 | S0 | . |
| N5 | S1 | S1 | . |
| N9 | . | S0 | . |
| N5 | S1 | . | . |
| N1 | S0 | . | . |
| N0 | . | . | . |
| N2 | . | . | . |
| N0 | . | . | . |
| N3 | . | . | . |
| N6 | . | S0 | . |
| N6 | S0 | . | . |
| N3 | . | . | S0 |
| N7 | . | . | . |
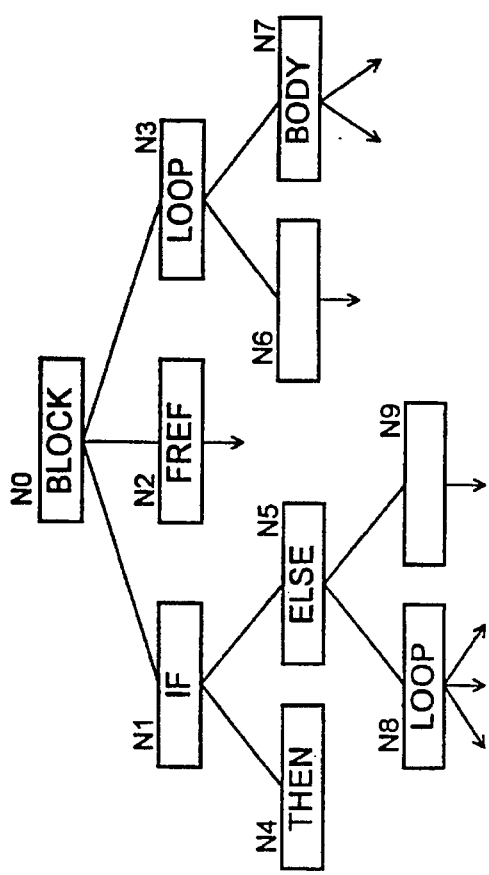
FIG. 16B
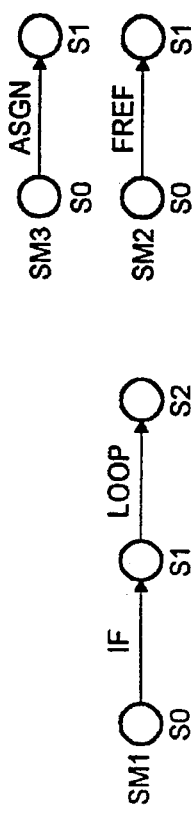
FIG. 16C
FIG. 16A

APPARATUS AND A METHOD FOR SEARCHING AND MODIFYING SOURCE CODE OF A COMPUTER PROGRAM

BACKGROUND OF THE INVENTION

When generating a program for a computer, especially a complex program including a plurality of modules, each possibly written by different programmers, implementing changes can be a laborious effort. If the source code of the new program includes not only instructional data but also remarks and other non-instructional data such as spaces etc, the correlation between non-instructional data and instructional data is lost when the program is compiled.

The present invention relates to computer programs, especially methods for analyzing and modifying large computer programs. The present invention provides for a new source program compiler and compiler preprocessor, which provide a parse tree representation of the source program. The parse tree representation of the source program can be processed by a new parse tree query language processor, which provides a new tool for querying and rewriting the source program, inserting changes and modifications into an original source code of a program or replacing the original source code with the rewritten source code, and for identifying sections of code for breakpoints during debugging. If the source code includes more than one module, the changes and modifications are effective in the proper modules.

The new compiler and preprocessor prepare a parsed representation of the original source program, in which the source code is separated into instructional and non-instructional elements. Each of the elements has an attached pointer linking it with the next following element in the program. Proper arrangement of the instructional and non-instructional elements allows to search within the parse tree of the program in the sequence of instruction execution. That is, instructional data are elements of the parse tree, non-instructional data are not part of the parse tree but interconnect elements of the parse tree. The use of various types of data and corresponding pointers allows a user to implement changes based on the parsed representation of the program and to reconstruct the original source code as well as any of the intended changes, modifications, or identifications making use of the query language of the present invention. Furthermore, since all elements of the original source code are included as instructional or non-instructional element, queries may include references to non-instructional tokens. Queries may also relate to the symbol table of the compiler.

Of especial interest is the capability to expand macro-instructions during a debugging operation and to have an easy tool to set breakpoints.

As will be discussed, the principles disclosed below with respect to computer programs for data processing can be applied to computer generated data such as files containing data of a computer aided design of an object. These data files are often large and contain data in a multi-level hierarchy, for which reason it is time consuming and difficult to access a specific item of the design to confirm its existence, or make changes to it.

OBJECTS OF THE INVENTION

It is an object of this invention to provide for a process which simplifies changing terms in a program written in a high level language.

It is another object of the invention to provide for an programmable process for changing terms in programs written in high level languages.

It is another object of this invention to identify the existence of certain terms in programs written in high level languages and selectively changing such terms.

It is another object of the invention to provide for a compiler which generates complete parse trees for programs written in high level languages.

It is another object of the invention to provide for a process including a compiler for generating object code from a high level language program, a compiler which generates parse tree representations for programs written in high level languages, means for detecting the existence of predetermined program terms, and for listing the location of the detected predetermined program terms in the program.

It is another object of the invention to provide for a process including a compiler for generating object code from a high level language program, a compiler which generates parse tree representations for programs written in high level languages, means for detecting the existence of a predetermined first program term, and for substituting, modifying or deleting a second detected predetermined program term associated with said first program term in the high level language program.

It is another object of this invention to provide for means to scan and search multi-level structured hierarchical data files containing data of computer aided design efforts.

SHORT DESCRIPTION OF THE INVENTION

The present invention relates to programming computers in a high level language, such as 'C' or ALGOL, and the correction or modification of such programs. When developing a program in such a high level language the program is subdivided in sections or source code modules. The various source modules are compiled individually to object modules and then combined by a linker. The resulting object code is then used to run the program.

If an error has to be corrected or a modification has to be made to the source code modules of a program, such an intention may range into areas of the program which are part of one or more source code modules. Furthermore, it is difficult to consider the impact of a modification or correction on the total program. The present invention provides for a summary of the impact of a modification and simplifies the actual execution of the correction or change.

The present invention provides for a new method and the required means to execute correction and modification operations with significantly lower risk than in known methods. The present invention uses two new types of compilers. Besides the compiler for generating object code modules in a well known fashion, one new type of compiler generates a complete parse tree from source code modules. This operation enables two functions. First, it analyses the source code and generates a new version of the source code with all macro instructions expanded, and in which all items of the source code, including remarks and spaces are retained, and second, it generates a parse tree with tokens and pointer tables interrelating the tokens which in turn allows to search for, trace and locate particular terms of interest in the original source code. This new version of the source code allows to construct source code modules, matching the original source code modules except for the entered changes.

The second new type of compiler allows navigation through the parse tree in accordance with a new query language defining the search criteria. This new query language supports searching for a declared symbol or program term, such as a certain function or statement, in the parse tree. An extension of the same query language allows manipulation of a detected searched for program term or symbol or of another program term or symbol associated to said detected program term or symbol by an expression provided in connection with the query. The extension of the query allows to delete, modify, replace the search for program term or symbol, or the associated program term or symbol with another program term or symbol, or to insert of one or more additional program terms or symbols. The new language provides also means for attaching non-instructional remarks to instructional tokens.

Modifications can be executed while a new source code is generated from the parsed representation of an original source code; thus, the parsed representation of the original source code remains unchanged, and the modifications are implemented whenever the source code generation process accesses a node in the parsed representation which has been identified for modification operations. This method makes it possible to divide a complex task of modification into sections, generate a list of detected searched for program terms or symbols and then apply the summary of all modifications to the process of generating a new source code. In simple modification tasks it is possible to combine generation of the new source code with the initial query for detecting searched for program terms or symbols.

The combination of a normal type of compiler with the first new type of compiler for generating a parse tree from the object code, and with a second type of compiler for a query language to be applied to the parse tree provides for complex, precise modifications in a high level language program.

In a practical application the task may be to modify a particular term in a source code in combination with certain conditions. The particular term is defined in the new type of query language program which is applied to the stored parse tree. Depending upon the query language program the particular term may be identified as existent, its location may be listed, and the term is modified in selected or all locations while the new source code is generated and sent to the source code module store. The normal compiler can then recompile the updated source code modules.

SHORT DESCRIPTION OF THE FIGURES

FIGS. 10A through 10G are illustrative drawings of sections of a parse tree to show a parse tree generated from a source code.

FIGS. 13A through 13E are illustrations relating to the expansion of macro-instructions.

FIGS. 16A through 16D are schematic illustrations of a parse tree scanning operation using additional contextual searches.

DETAILED DESCRIPTION OF THE INVENTION

Figure 1:
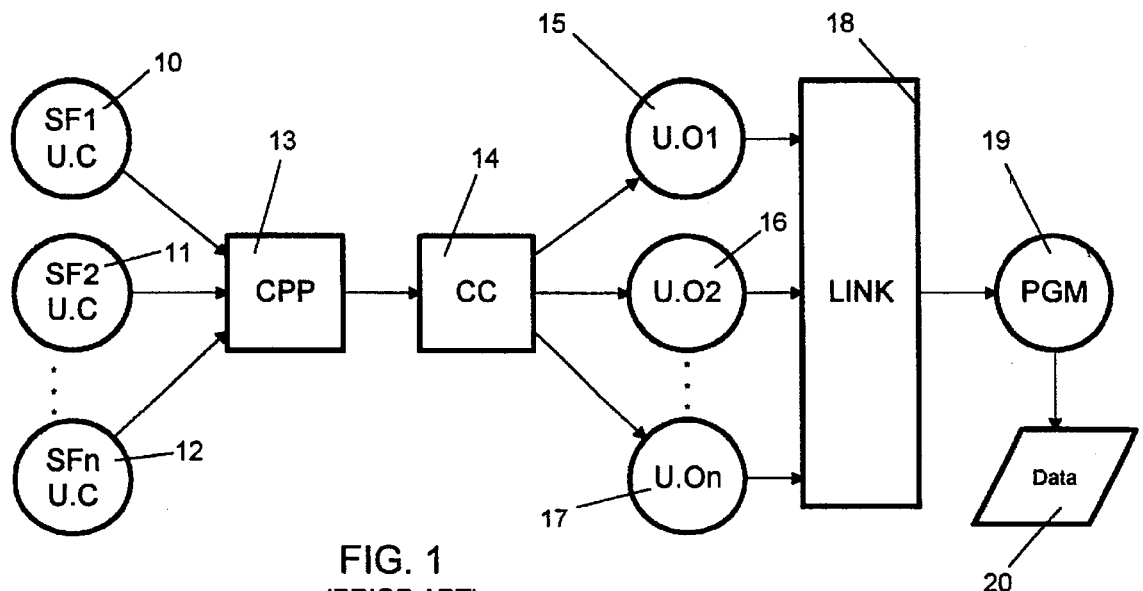
FIG. 1 is an illustration of a conventional process for compiling source code modules and linking object code modules to a program.

In the following description of the invention various types of data are referenced as modules. Such data may be program data, application data, instructions, tables, or reference information, which are involved in the process of the present invention. During such a process these modules are stored in various storages or sections of a storage of a computing system. Because it is of little or no importance how these modules are stored, it is important that the data of a module are stored in such a manner that integrity the particular module is maintained. Thus the use of a particular symbol for a module represents only the storage space occupied by the particular module. FIG. 1 is an illustration of the well known process of compiling a computer program. The source code may consist of a one or more user supplied source code modules, of which modules 1, 2 and n are illustrated in FIG. 1 and referenced as 10, 11, and 12, respectively. Preprocessor 13 expands macro-instruction prior to the actual compilation in compiler 14. Compiler 14 translates preprocessed source code into machine code, which is acceptable by the particular processor. The translated machine code is still modulerized as indicated by object files U.O1, U.O2, and UO.n, referenced in FIG. 1 as 15, 16, and 17. A Linker 18 of known construction combines object code modules 15, 16, and 16 to the final object code 19, which is applied to a suitable processor and input data 20 for execution generating a desired output.

Figure 2A:
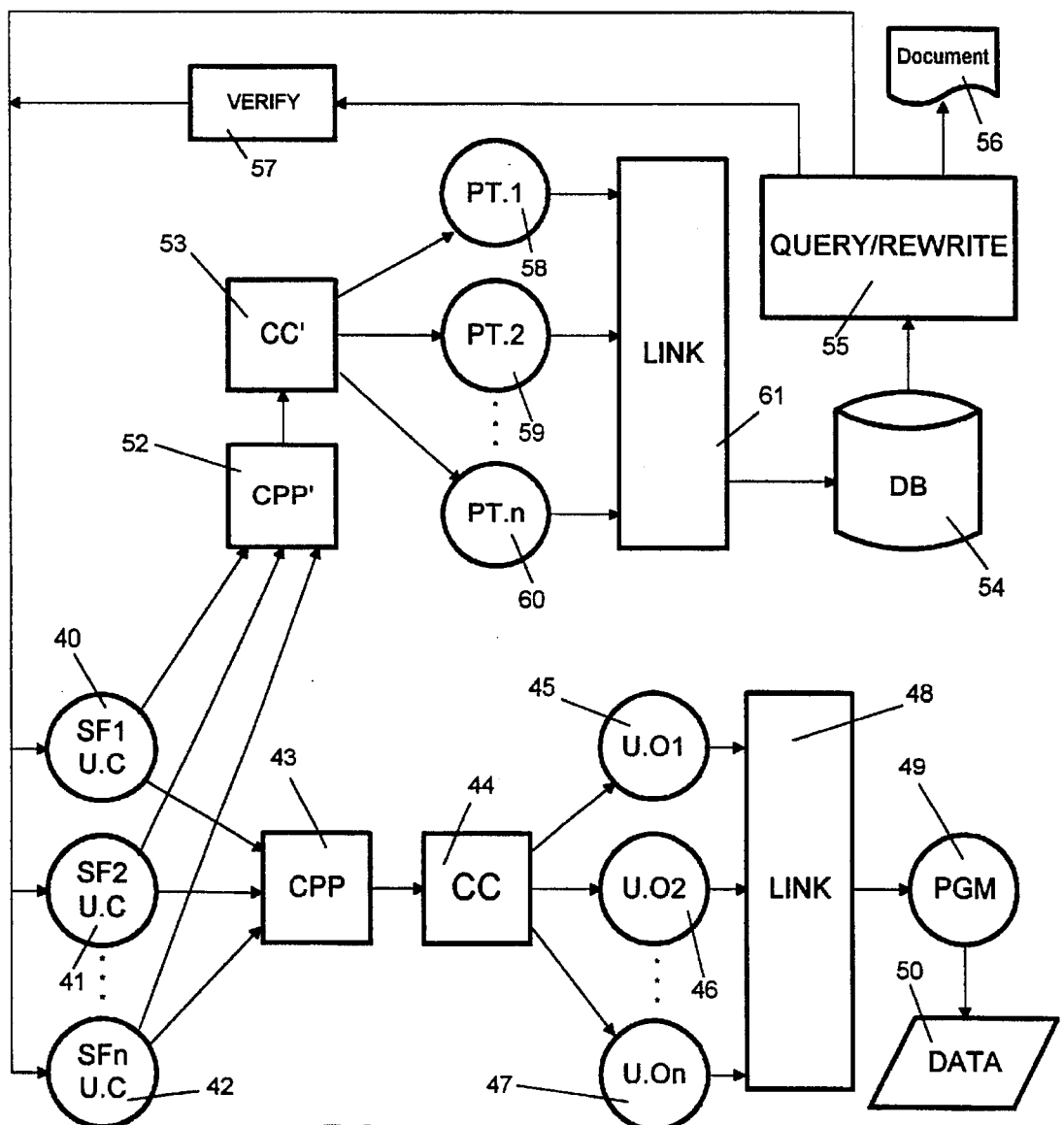
FIG. 2A is an illustration of an arrangement for generating object code modules and a parse tree from the same source code modules.

FIG. 2A is an illustration of a dual compiler arrangement including the new compiler of the present invention. While the compiler of the present invention can be used in a stand-alone configuration, in FIG. 2A it is shown in combination with a well known compiler to illustrate the cooperation between both the compilers. This separation of the two compilers is provided to illustrate the difference between them. It is considered to be within the skills of the artisan to have both compilers perform in the same computer environment, thereby reducing the hardware requirements at the expense that there may be no concurrent operation possible.

As already discussed with reference to FIG. 1, the source code may consist of one or more user supplied source code modules, of which modules 1, 2 and n are illustrated in FIG. 2A and referenced as 40, 41, and 42, respectively. Preprocessor 43 expands macro-instruction prior to the normal, well known compilation in compiler 44. Compiler 44 translates source code into machine code, which is acceptable by the particular processor. The translated machine code is still modulerized as indicated by object files U.O1, U.O2, and UO.n, referenced in FIG. 2A as 45, 46, and 47. A Linker 48 of known construction combines object code modules 45, 46, and 46 to the actual object code 49, which is applied to a suitable processor and input data 50 for execution generating a desired output.

The compiler arrangement of the present invention receives source code from modules 40, 41, and 42. Macro-instructions are expanded in preprocessor 52. The actual compilation of the source code into a parse tree is performed in compiler 53 which generates code which is stored in parse tree modules 58, 59, and 60. This generated code includes all information contained in the source code of modules 40, 41, and 42 in form of tokens. Each token includes pointers to symbol tables used by preprocessor 52, and to other tokens. The result of the compilation, parse tree modules 58, 59, and 60, is applied to linker 61, which provides the final token and parse tree data base 54.

Parse tree data base 54 is used in queries and for modifying the source code using query/rewrite processor 55. Queries are used to isolate a syntactic sub-unit of a parsed source code of modules 40, 41, and 41. Queries are expressed in a new query language developed for defining search criteria and modification instructions. The required query language compiler is part of query/rewrite processor 55.

Thus, during a normal compilation a compiler (CPP & CC) translates source code into machine instructions (object code). The compiler of the present invention generates symbolic information including the parse tree, pointers and other information necessary to make changes and to reconstruct the original file with the desired changes. The generated symbolic information is stored in a data base 54 after passing through linker 61 which combines the parse tree modules PT1 through PTn 58, 59, and 60 (FIG. 2A).

Figure 2B:
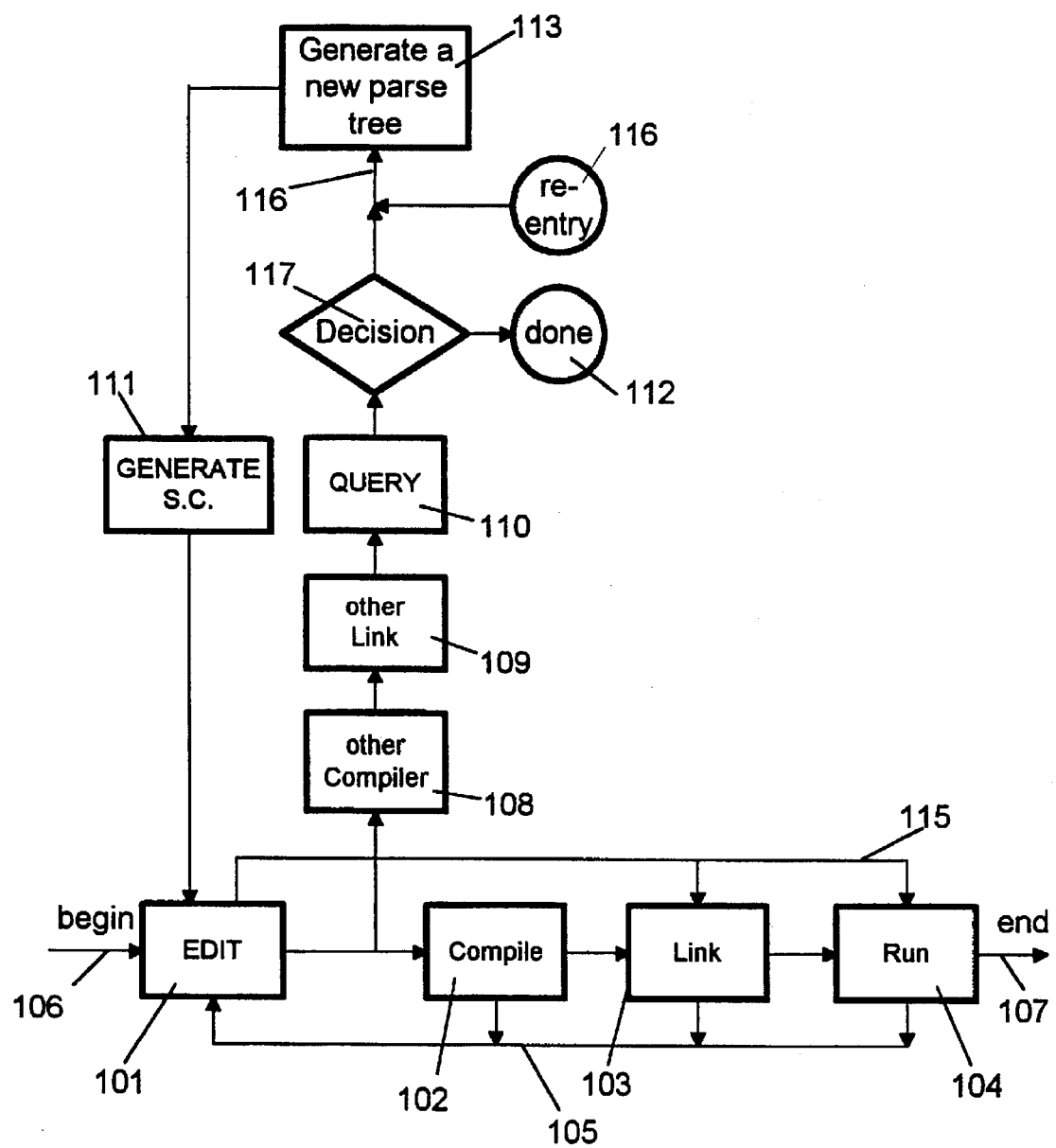
FIG. 2B is an illustration of a flowchart of the process steps executed in an arrangement depicted in FIG. 2A.

FIG. 2B is a schematic illustration of the application of the present invention. In a normal computing environment source code is edited 101 and compiled 102. The resultant object code modules are linked 103 and can be run 104 and can perform the expected operation up to end 107. If errors occur during compilation 102, linking 103 or at run time, then the source code has to undergo an editing operation 101 to correct the problems.

The present invention offers a new procedure for correcting or changing source code. The original source code is fed into the new compiler for generating a parse tree 108 and a linker for linking the source code module related parse tree modules 109.

As soon as the parse tree modules are linked, search query instructions can be issued 110 for finding nodes of interest in the parse tree. These nodes are listed and made available to the user, thereby ending process 112. Query instruction 113 can cause selective editing operation to be applied during generation of new source code 111 from the parse tree. The modified source code modules can be compiled 102, linked 103, and run 104.

Search query 110 and generation of a new modified parse tree 113 can be executed in one or two pass operations depending on the complexity of the intended modifications. Decision 117 selects a one or two pass process. For a two pass process reentry 116 occurs prior to application of generation of a new modified parse tree 113 when generating the new source code. It is of significant importance that the parse tree remains unaffected when a new source code is generated. Thus the task of modifying source code of a process can be subdivided. Each sub-divisional process uses the original parse tree. The result is contained in sub-divisional new object modules which are to be combined for a new complete source code.

Figure 3:
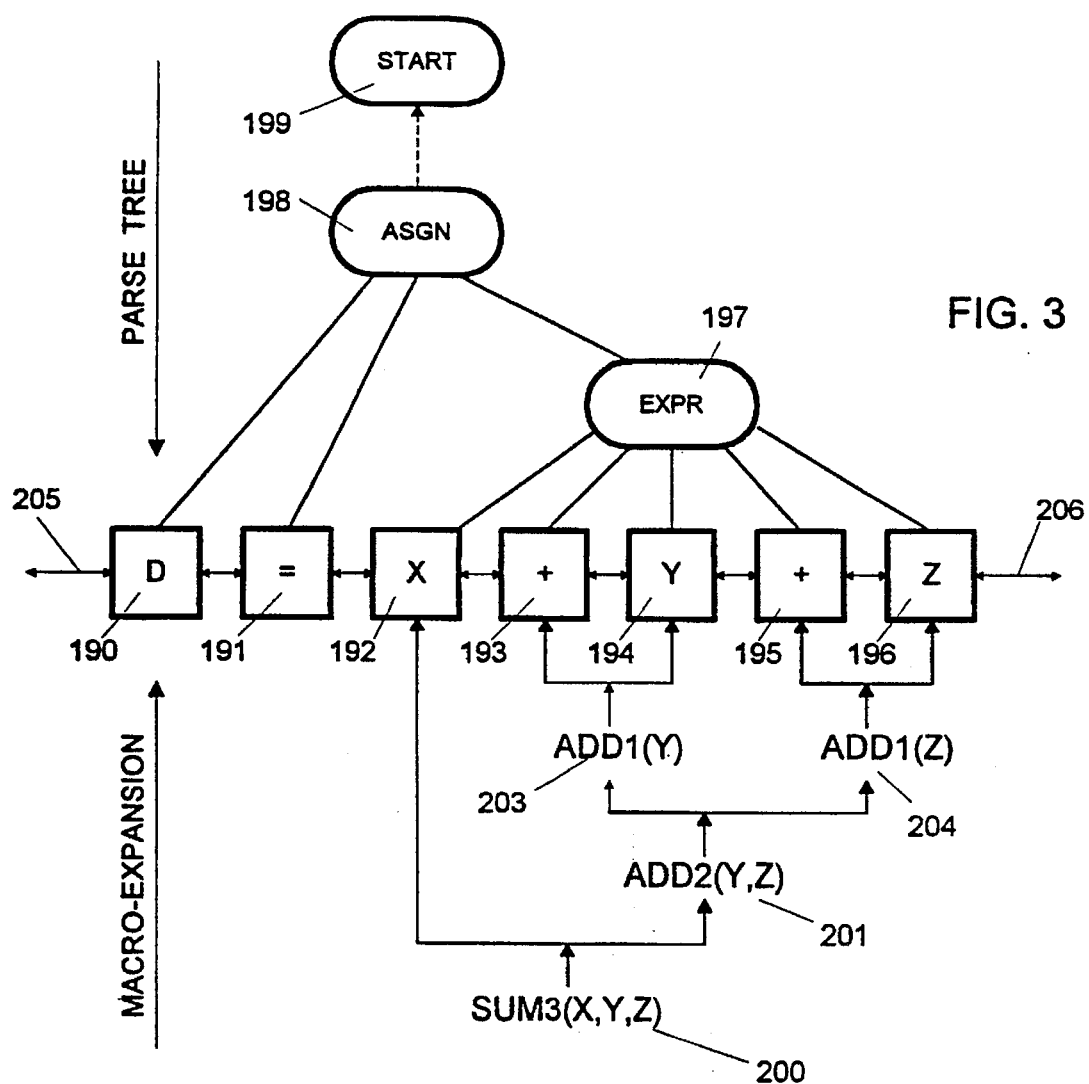
FIG. 3 is an illustration relating expansion of a macro-instruction to the use of the parse tree.

FIG. 3 is an illustration relating expansion of a macro-instruction to the use of the parse tree. Common to both, macro-instruction expansion and parse tree are tokens 190 to 196. Tokens are the result of an expansion of a macro-instruction, such as macro-instruction 200. The expansion process operates stepwise, reducing a macro-instruction level by level. A SUM3(X,Y,Z) 200 expands to XADD2(Y, Z), a token "X" 192 and macro-instruction ADD2(Y,Z) 210. Instruction ADD2(Y,Z) 201 expands to two instructions ADD1(Y) 203 and ADD1(Z) 204. Finally Add1(Y) 203 and ADD1(Z) 204 expands to tokens "+" 193 and "Y" 194, and tokens "+" 195 and "Z" 196, respectively. Tokens "D" 190 and "=" 191, which represent an assignment, result from a different operation in the expansion process. The series of tokens 190 through 196 is linked to preceding and succeeding other tokens, not shown in FIG. 3, as indicated by arrows 205 and 206.

In the parse tree the same tokens are linked as shown above the line of tokens 190 through 196. Tokens are linked by references, as indicated by double arrows between adjacent tokens. The use of these references or pointers is explained in more detail with reference to FIG. 8C. The compiler generating the parse tree from the tokens groups the tokens in accordance with the syntax. In the example of FIG. 3 the three tokens of the elements of the sum 192, 194 and 196, and the linking operators 193 and 195 are combined into the expression "EXPR" 197.

Value "D" 190 and "=" sign 191 are combined with "EXPR" 197 to the item "ASGN" 198. "ASGN" is a part of the parse tree and is linked via branches represented by arrow 199 with the root "START" 205 of the parse tree.

Thus, as shown in FIG. 3, the line of tokens is developed from the macro-instructions, from the bottom in FIG. 3. The same line of tokens is accessed by the parse tree processor from root 199 of the parse tree, from the top in FIG. 3.

Figure 5:
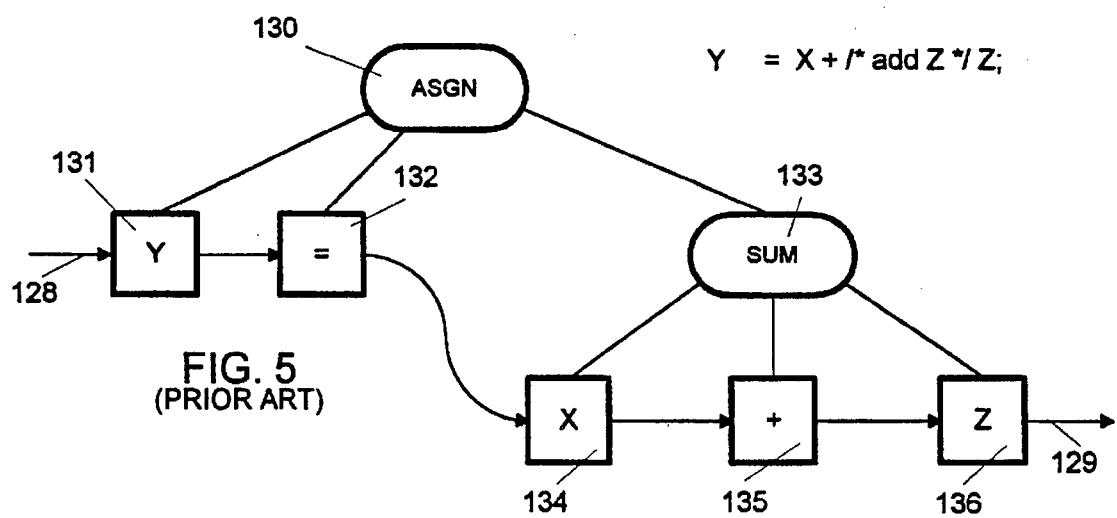
FIG. 5 is an illustration showing a conventional, compiled macro expansion.

FIG. 5 is an illustration of a function $Y=X+ /* add Z */ Z;$ having been preprocessed in preprocessor CPP (see FIG. 1, ref 13) in a conventional way. The original code may include additional spaces and a remark (e.g.: /* add Z */) located within the functional expression. Assignment 130 points to elements 131, 132, and 133 of function Y=SUM, respectively. SUM 133 is defined by elements 134, 135, and 136, "X", "+", and "Z", respectively. In accordance with the rules of the particular language in which this function is expressed, the compiler and its preprocessor will remove all non-instructional elements such as extra spaces and remarks.

Elements 131 and 136 are linked by pointers 128 and 129 to other elements of the same compiled source code.

Figure 6:
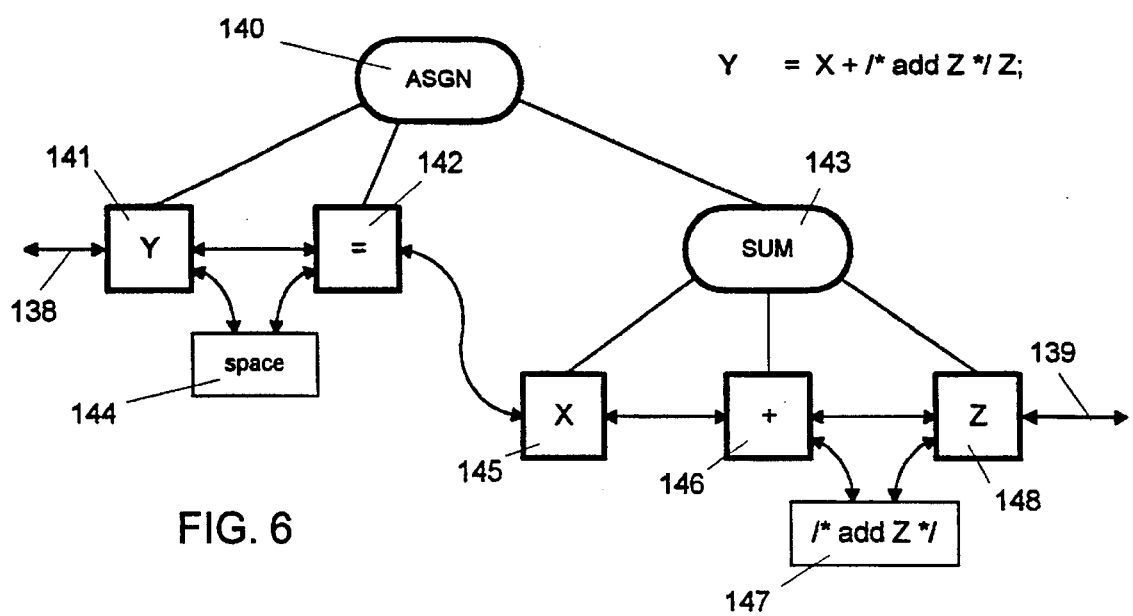
FIG. 6 is an illustration showing a compiled macro expansion using the compiler of the present invention.

FIG. 6 is an illustration of the same function of FIG. 5

$Y=X+ /* add Z */ Z;$ having been preprocessed using a preprocessor CPP' (see FIG. 2A, ref. 52) of the present invention. Compiler 53 and preprocessor 52 of the present invention do not delete any non-instructional elements. The compilation of instructional elements follows the rules of the particular language as exemplified in the function of FIG. 5. However, both non-instructional and instructional elements become tokens interconnected by pointers to neighboring tokens in the parsed representation of the function. Assignment 140 points to elements 141, 142, and 143 of the function Y=SUM, respectively. SUM 143 is defined by elements 145, 146, and 148, "X", "+", and "Z", respectively. Non-instructional elements of the function are represented by token 144 and 147, spaces after "Y" and the remark "add Z" enclosed by the remarks notification "/* */". Pointers represented by arrows show how the elements of the function are interrelated. Elements 141 and 148 are linked by pointers 138 and 139 to other elements/token in the same parsed representation of a source code.

Preprocessor 52 expands macros by textual substitution, on a token-by-token basis. The expanded macro might therefore not correspond to a syntactic rule as set forth in the language definition. The macro itself, however, is represented as a tree, which may recursively employ other macros. This suggests an "upside-down" expansion, with the leaves of the tree being tokens (instructional or non-instructional) of the program itself. Interior nodes of the macro expansion tree have sufficient information to indicate their position within the parse tree. The position information is cross-referenced for look-up operations. Exterior nodes and tokens of the parse tree have similar information, so that a traversal of a parse tree (which, by definition, must represent the already preprocessed source code) provides visibility into any of the macros used, including subtrees, and which tokens they span. If a given stream of tokens lies entirely within a macro expansion, then it lies only in one top-level macro expansion tree.

Figure 7:
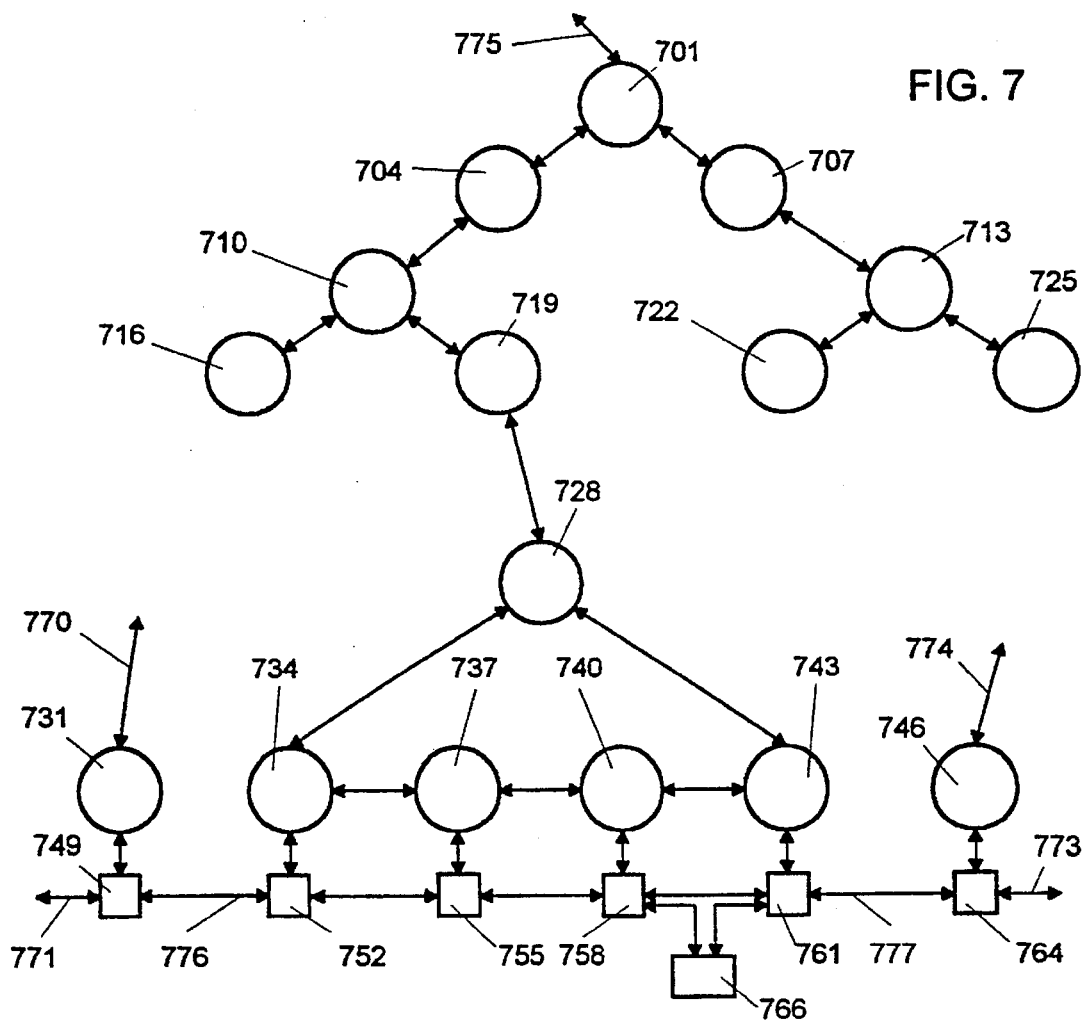
FIG. 7 is a schematic illustration of a section of a simplified parse tree.

FIG. 7 is a schematic illustration of a section of a parse tree and does not include the root node. The parse tree of FIG. 7 includes path 775 from a node not shown in this figure to node 701, and down to computational nodes 734, 736, 740, and 740. Each of these four computational nodes is linked by pointers to one of computational tokens 752, 755, 758, and 761, respectively. A non-computational token 766 is shown to be linked to computational tokens 758 and 761.

Instructional tokens 752 and 761 include pointers 776 and 777, respectively, to neighboring tokens which are not subordinate to node 728, in accordance with the entered source code.

An interior node of the parse tree contains pointers to subtree or token information. An interior node also contains encodings that identify its syntactical position with respect to the language definition. These encodings provide the key to the syntactic aspects of a query.

At the exterior of a parse tree or a sub-tree, a branch of the parse tree, there are tokens, which include pointers to the actual text comprising the program. These pointers include information such as line numbers, file names and pointers to "non-computational tokens", such as space and comments.

Pointers to neighboring first/last same level computational tokens (thick lined squares), Pointers to neighboring first/last same level non-computational tokens of a sub-tree (thin lined rectangles), Pointers to next higher/lower level nodes previous/next (dashes), Pointers to root node of macro, (dot-dash).

One powerful optional pointer relates nodes with their associated roots or sub-roots in the parse tree.

Figure 8A:
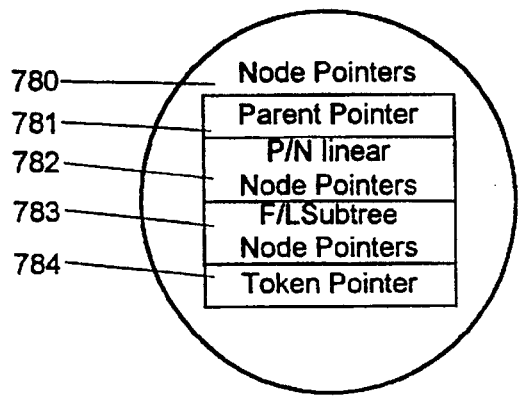
FIGS. 8A and 8B are schematic illustrations of pointer tables of nodes and tokens, respectively.

FIG. 8A is a schematic illustration of a node 780 and its pointers. These pointers make up an element of a tree. A tree is characterized by a unique parent, a previous and next sibling, and a sublist of other trees. The set of pointers of a node define the position of the node within the parse tree.

There is a parent pointer 781 defining to the other node to which this current node is sub-ordinate. This parent pointer holds the location of the current node's (unique) parent. On the other hand, the current node is in the list of pointers of the parent, and is a subtree of the parent node. Previous and next linear pointers hold the location of the previous and next subtree, with respect to the current node within it's parent. Thus, pointers 781 and 782 identify the previous nodes and the next node relative to the root of the parse tree.

First and last subtree pointers 783 link a node to one or more nodes at a lower level of the parse tree. These pointers reference the beginning and end of the current node's list of subtrees. The current node is the parent of all subtrees in this list, and is an ancestor of all subtree in the list and below. The presence of a list of subtree indicates that the current node is an interior node, that is, the current node has only subtrees, and no actual program input data, associated with it. In FIG. 7 such an arrangement is shown involving node 728 with exterior nodes 734, 737, 740, and 743. Each of the exterior nodes includes a pointer to the related token of tokens 752, 755, 758, and 761, respectively. A token pointer holds the location of input data associated with the node. The presence of this pointer indicates the current node is an exterior node, that is, the current node has no subtree, and is associated with input data, which can be found by following the Token Pointer.

Figure 8B:
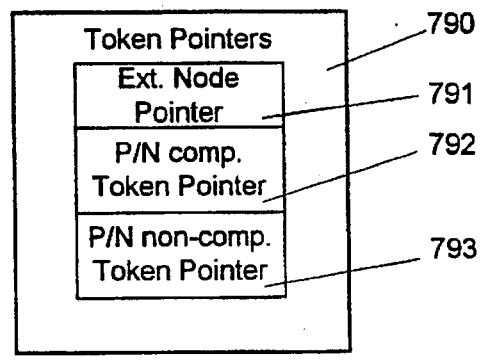

FIG. 8B is a schematic illustration of a token 790 and the pointers related to it. As already discussed above, there are two types of tokens, which are referenced here as computational and non-computational tokens. Computational tokens include a pointer 791 to its associated exterior node, and it has first left and right pointers 792 to the adjacent computational tokens, and second left and right pointers 792 to adjacent non-computational tokens, if applicable.

This provides for the rules that a first or last exterior node misses one of the linear left and right pointers, an exterior node directly or indirectly enclosed by a first and last exterior node has no parent node pointer. Nodes internal to the parse tree do not have first and last exterior node pointers.

Figure 8C:
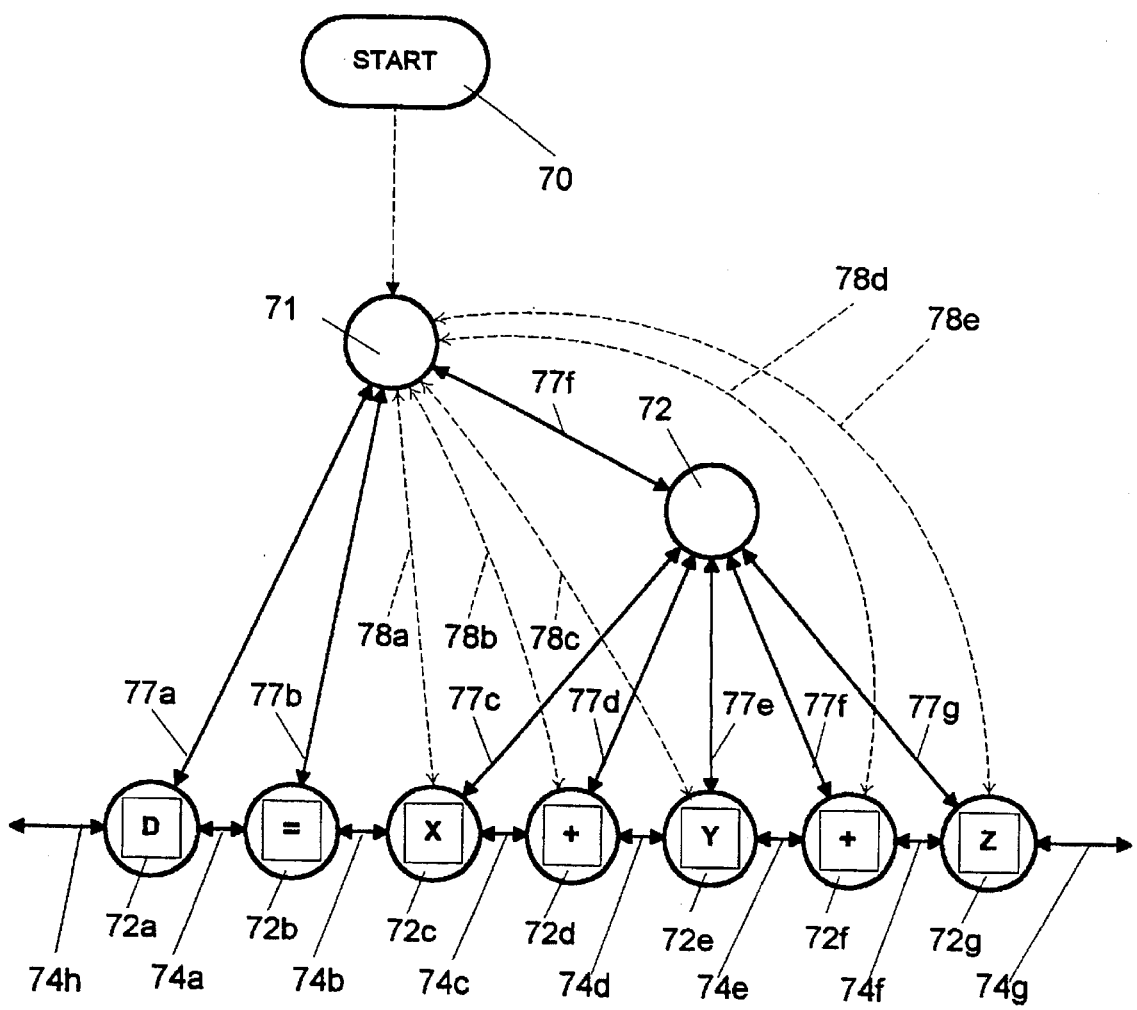
FIG. 8C is a schematic illustration showing the pointer links between nodes and between nodes and tokens of a function.
Figure 8C:
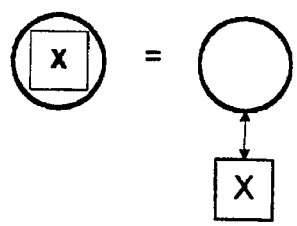

FIG. 8C is an illustration of one method of establishing pointer linkages between nodes and tokens in a parse tree. The expansion of a macro-instruction resulted in the token sequence $D=X+Y+Z$ 72a through 72g, which is located somewhere in the parse tree. (Tokens (square symbols) and associated external nodes (circles) are combined in this illustration in one symbol, a square within a circle.) Tokens 72a through 72g are successively linked by pointers 74a through 74f. The sequence of token 72a through 72g is linked to preceding and succeeding tokens, not shown in FIG. 8C, as indicated by lines 74h and 74g, respectively. Each of the tokens 72a through 72g is linked by pointers to a node of a next higher level by a pointer link represented by lines 77a through 77g. In addition to these pointer links additional pointer links may be provided for each node to a node at two levels above the particular node, as indicated by dashed lines 78a through 78e. Other linkages may be introduced in accordance to need and the possibility of accelerating the query process. One other pointer linkage may relate to a start node 70 if the start node is not the root of the parse tree.

It is considered to be within the skill of the artisan to expand on this scheme to enhance processing of parse tree data and for special applications. Such an expansion was already mentioned above with reference to FIG. 5C, that each internal or exterior node may have an additional pointer to the root node (not shown in FIG. 7). In a normal environment the use of these pointers are considered by the inventor to be optimal.

Figure 12A:
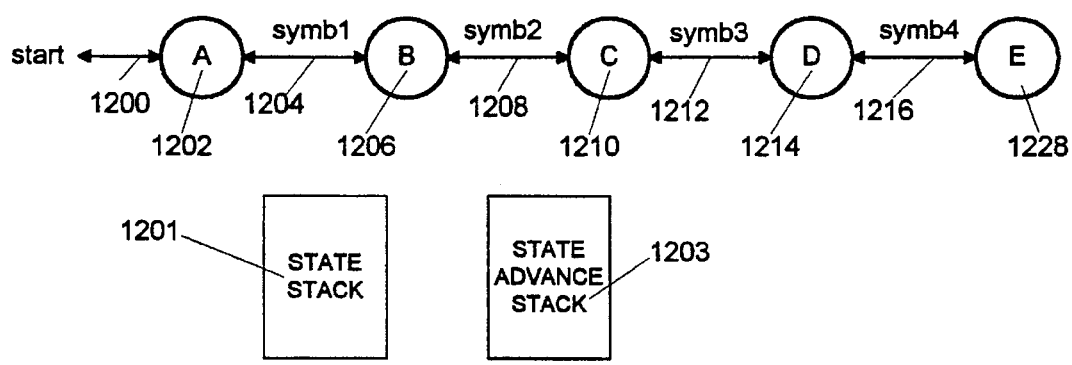
FIGS. 12A and 12B are schematic illustrations of a simple and a more complex navigation process.

The navigation through a parse tree requires a systematic search through all branches of the parse tree, with the ability to pass back and forth through sub-branches. Thus the search engine has to know at all times, what branches have been searched and which node in the parse tree has been reached. This task is most easily be solved by an arrangement of memory stacks which can be associated with nodes and the transition between nodes. FIG. 12A is an illustration of a search for a certain symbol defined by state E and preceded by symbols symb1 through symb4.

Figure 12B:
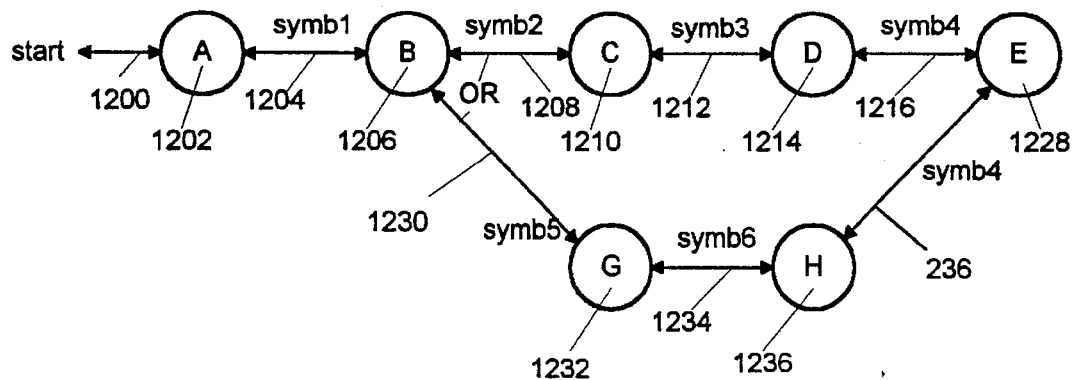

The state advance stack is of importance when a search definition allows multiple choices for finding a search term. Such a situation occurs when a search term can occur under more than one condition. FIG. 12B is an illustration of such a type of search definition in which the symbols searched for is either preceded by the sequence of symbols symb1 through symb4, or symbols symb1, symb5, symb6, and symb4.

Figure 11:
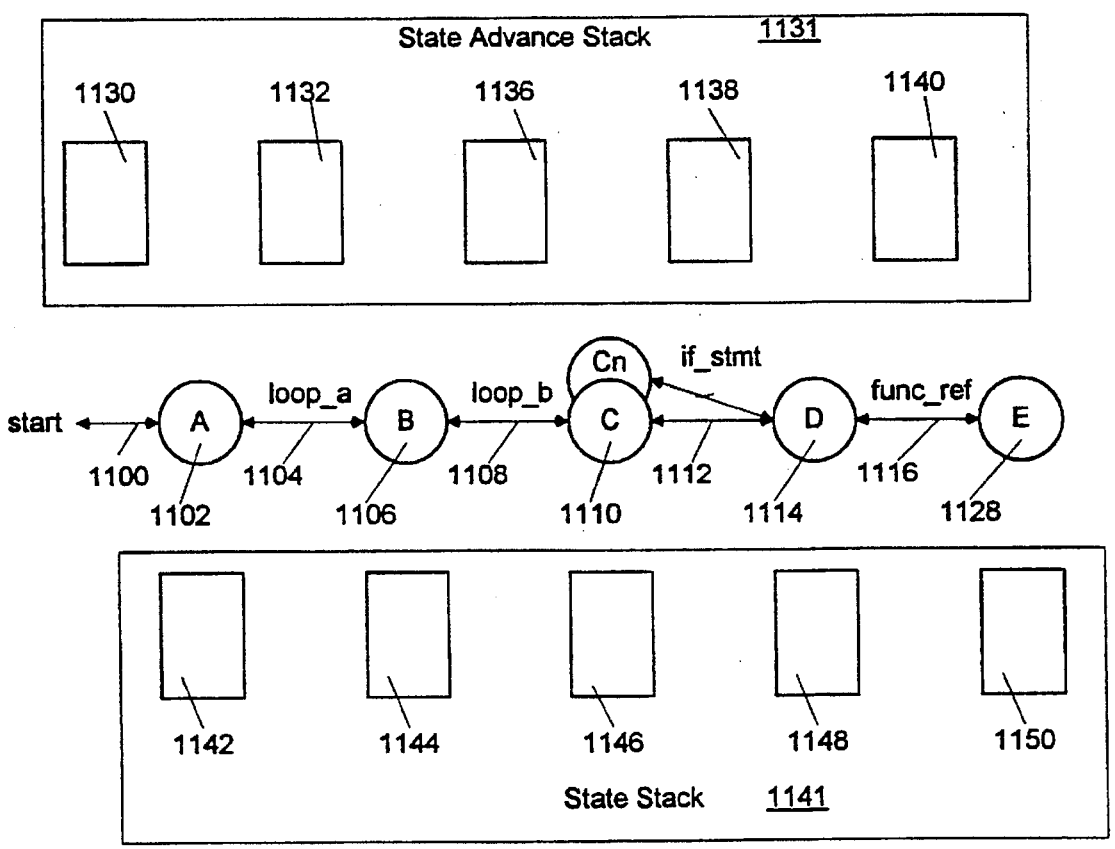
FIG. 11 is a schematic illustration of a simple navigation process.

The search starts at start 1200 by advancing to state A 1202. In state A 1202 the search engine searches for symbol symb1 1204. Upon detecting a symb1 the search advances to state B 1206, which causes a search either for a symbol symb2 or for a symbol symb5. Upon detecting a symb2 search advances along 1208 to state C 1210; upon detecting a symbol symb5 the search advances along 1230 to state G 1232. The selection is recorded in the state advance stack 1131 (FIG. 11).

The problem is demonstrated when arriving at state E 1228 from either state D 1214 or state H 1236 after detecting a symbol symb4. When returning through a branch of the parse tree, the search engine has to track back through the same branch and the associated states as it passed through while searching. State advance stack and the state stack ensure proper sequencing by pushing pointers while in search forward operation, and popping pointers when in back tracking operation.

It is another object of the invention to provide for a simple and easy to understand language for formulating search and operational instructions. Search instructions define the search term and search conditions. The operational instructions define what functions have to be performed when a defined search term has been found. Such functions may be to establish a list of where the search term or terms are located in the parse tree, or the function calls for inserting, substituting or deleting certain symbols from the parse tree.

In the following description it is shown how a user might navigate the parse tree in order to isolate and, perhaps, rewrite selected syntactic sub-units.

At the basis of all navigation methods is the Parse Derivation Notation (PDN), used for decades in Academia to illustrate the expansion of a start symbol for a grammar into a complete sentence (program) in the language specified by the grammar, by successive application of the rules defining the language.

An essential property of a useful navigation utility is the ability of the navigation engine to provide intermediate steps, so that a user need not know all the details of the structure of the language at all times.

Programming Language Definition

Programming languages (e.g. C, Algol) are defined in terms of a set of names (referred to as symbols) and syntactic relationships between these symbols (referred to as rules). These rules formally define the structure of the programming language.

The standard term for describing programming language definitions is Backus-Naur Form (BNF).

There are many variations of BNF, but the essential structure of the rules is:

<some-symbol-name>::= <an-expression-containing-symbol-names>

So that a computer "program" can be defined by rules such as:

program ::= "begin" statement_list "end"

statement_list ::= statement * statement ::= assignment ¦ if_statement ¦ loop and so forth, until the entire language is defined.

Figure 4:
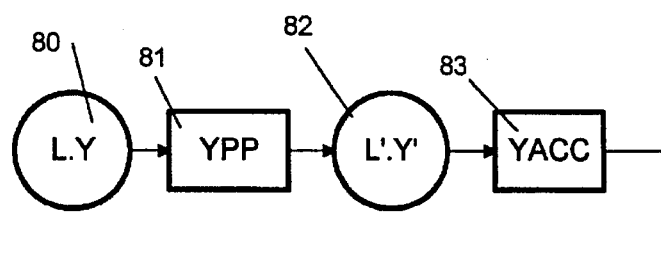
FIG. 4 is an illustration of the process of the present invention for processing and compiling a new programming language.
Figure 4:
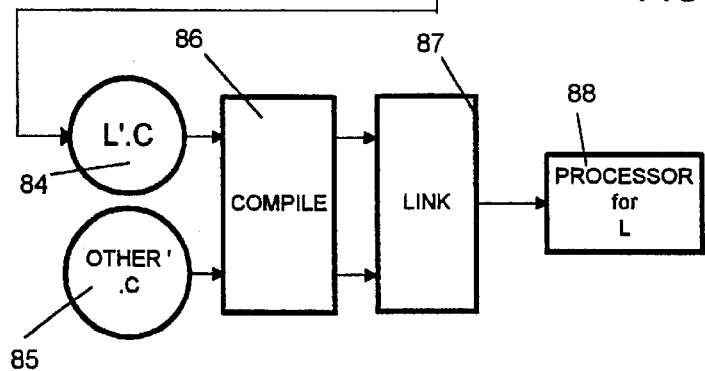

There are programs calls "compiler-compiler"s that read, as input, a formal description of a programming language, and generate, as output, a compiler for that language. Such a program in common use today is YACC (Yet Another Compiler Compiler). See FIG. 4.

Parse Trees

When a programmer-written program or module (source file) is presented to a compiler, the compiler performs syntax analysis on the source file. If there are errors, the errors are listed for the programmer.

If the compilation completes successfully (no errors detected), then the source file is syntactically correct. That is, it is written correctly in the language that the compiler processes.

A tree structure is usually used to process the phase of compilation immediately following syntax-analysis. It is called a "tree structure" because each element of the structure has a unique parent element, perhaps previous/next sibling elements, and potentially many sub-elements.

Each element (or node) of the tree corresponds to a symbol of the language definition, and that node's subtrees correspond to the symbols in the rule that the syntax analyzer has determined to be correct at that point in the program.

At the bottom of the parse tree, the exterior nodes point to the tokens that make up the program (i.e. operators, names, parentheses, etc.). The tree-structure allows the compiler to determine what sort of machine instructions should be generated.

Parse Derivation Notation (PDN)

In the Parse Derivation Notation of the present invention a user can explicitly type a syntactic expression (a computer program) that defines a path through a parse tree. Symbol names (symbols in the language definition) separated by special arrow-like tokens sketch out a path through the parse tree, whose interior nodes are encoded with grammar symbols.

Search algorithms can be applied to a navigation expression to fill in missing path elements.

Navigation Expressions

It is possible to selectively collect those nodes of a parse tree that conform to a syntactic requirement, which may be "elaborate". Such a syntactic requirement may have to do with the construct's position within the parse tree, or it may have to do with the (syntactic) contents of the construct.

One can specify a path down through the tree using symbols connected by arrows and possibly grouped by parentheses or brackets with iteration specifications.

For example, suppose one wants a list of certain function calls made within an "if" statement that is located within a loop that is at least a double nested loop (i.e. an inner loop).

For the search path illustrated in FIG. 12A the search definition could be expressed as start_symbol ==> symb1 ==> symb2 ==> symb3 ==> symb4 ==> search symbol.

For the search paths illustrated in FIG. 12B the search definition could be expressed as start_symbol ==> symb1 ==> ((symb2 ==> symb3 ==>) | (symb5 ==> symb6 ==>)) symb4 ==> search symbol, whereby "start_symbol" is the root of the parse tree.

"==> symb$_n$" defines the next search symbol.

"|" defines an alternate search path.

"start_symbol ==> symb1" selects those symbols symb1's which are accessible from start_symbol so that there are no other symbols symb1's in between them.

Query Search Process

There are three major data structures:

a tree (a parse tree, for example), a finite state automaton (FSA), and a stack of pointers to FSA states and tree nodes.

The transitions in the FSA are labelled with the symbols with which the tree is encoded. The nodes of the tree are encoded with symbols (which, in the case of a parse tree, are symbols of the grammar defining the parsed program language).

The stack of pointers to FSA states and tree nodes, from the bottom up, shows a history of the FSA activity that lead us to this point in the search, constituting a histogram. If the search on a branch fails, the history of that search relating to that branch is popped off of the stack and the search continues on the next branch. If a search is successful (i.e. a "hit"), then the stack is traversed to instantiate the successful path and the search continues on the next branch.

There is one start state in the FSA, with one transition leading out of it. That one transition is the start symbol of the grammar, and also, the encoding of the root of the parse tree. The act of starting at the root of the parse tree allows to follow the initial transition.

That is, the start state is the root of the tree, and the start state has only one initial transition. At any point in the search, the stack of pointers contains all of the information about the current state of the search. At any given point in the search, the search proceeds from a given node "N" in the parse tree, and a given state "S" in the FSA.

The search proceeds to nodes beneath "N" in the tree whose encoding matches a transition "T" out of state "S". For each such transition, there is another state "S'" that is the target of the transition. The existence of a node beneath "N" of encoding equal to "T" will move the current state to "S'". The nonexistence of such a node implies that, if current state "S" is not an accept state, then this (sub-) search has failed.

If, however, a node "N'" is found beneath node "N" whose encoding matches a transition "T" out of state "S", two stack operations are performed.

First, "N'" is pushed onto the stack associated with "S", indicating that at this point in the search it was node "N'" that directed us to take this transition.

Second, "S'" is pushed onto a stack of pointers to states leading to the current state configuration.

```
Pseudo Code of Query Search Process
struct State
{
    List transitions;
    Boolean isAccept;
};
struct Transition
{
    State *source;
    State *target;
    Symbol *symbol;
};
struct ConfigElt
{
    Node *node;
    Transition *trans;
};
struct ConfigStack
{
    ConfigElt *top;
};
ConfigStack confStack = EMPTY; /* initialize config stack */
/*
    This function takes as input:
    Node N0:
        The root of the search.
    Transition T0:
        The transition that led to the
        current (to be computed) state.
    Upon entry, a state (S0) is computed which is
    the target of the transition T0.
    If S0 is an accept state, then the
    current configuration is captured and
    placed in the result set of pointers of this search.
    For each subnode (N1) of N0, and for each
    transition (T1) out of S0, we must search
    for a node beneath N1 with the same type as T1.
*/
void
Seek(Node N0, Transition T0)
{
    State S0;
    PushConfig(N0, T0);
    S0 = TargetState(T0);
    if (IsAccept(S0))
    {
        CapturePath( );
    }
    for (N1 in SubList(N0))
    {
        if (ExteriorNode(N1))
        {
            Transition T1;
            Symbol symbol;
            symbol = TokenType(N1.token);
            foreach (Ti in TransitionSet(S0))
            {
                if (symbol == T1.symbol)
                {
                    Seek(N1, T1);
                }
            }
        }
        else
        {
            Transition T1;
            Symbol symbol;
            /*
            Always try a longer path, to get ALL hits.
            This takes care of greedy search in cycles,
            and also finds otherwise hidden matches.
            */
            Seek(N1, T0);
            symbol = NodeType(N1);
            foreach (T1 in TransitionSet(S0))
            {
                if (symbol == T1.symbol)
                {
                    Seek(N1, T1)
                }
```

-continued

```
      }
    }
  }
  PopConfig( );
}
```

EXAMPLE

The operation of the present invention will be made more apparent with the following example of a search through a parse tree.

Figure 9A:
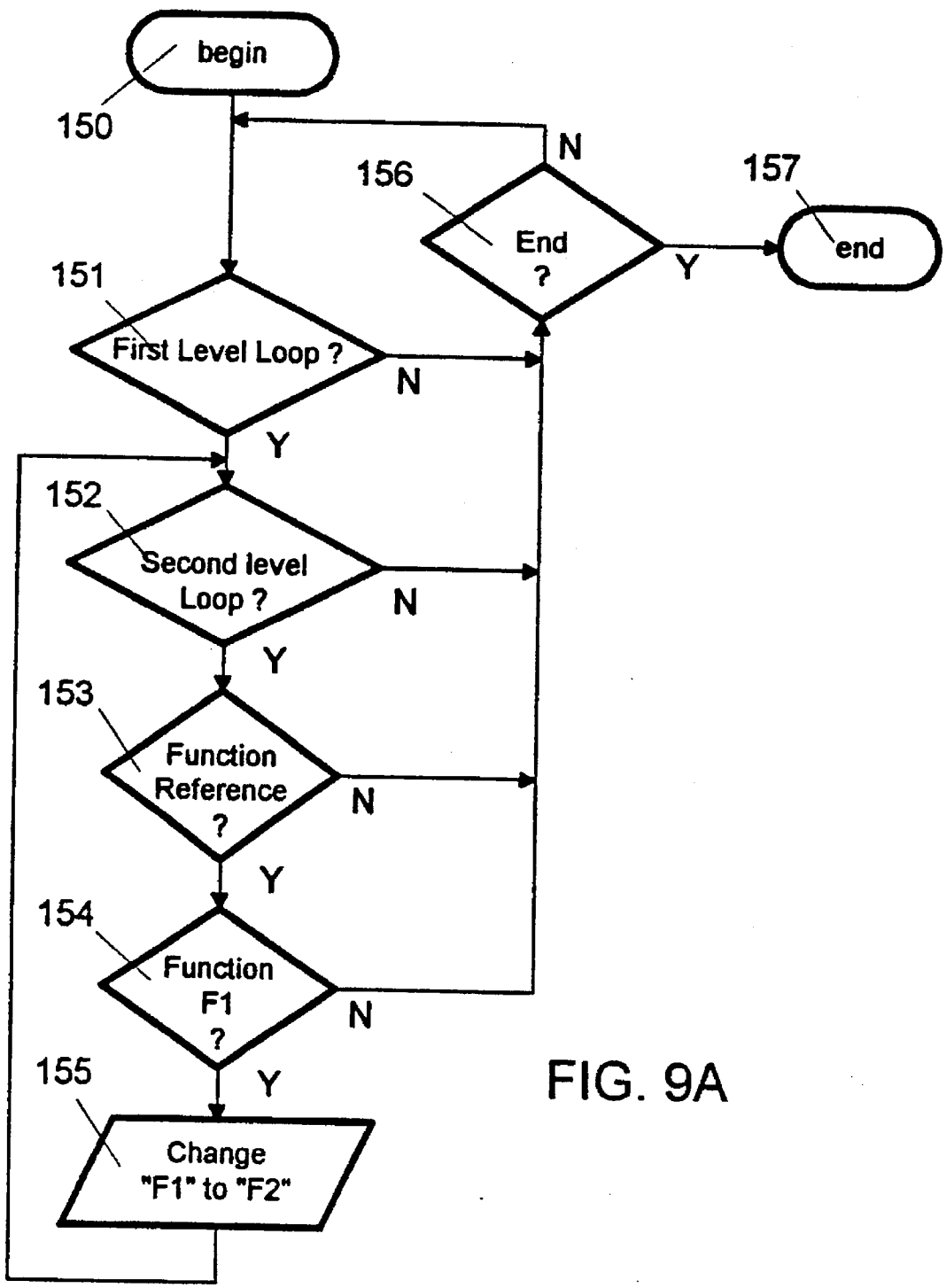
FIG. 9A is an illustration of a flowchart of a simplified operation using the method and means of the present invention.

FIG. 9A is an illustration of a simple operation of the present invention. The task is to replace a certain function F1, if and only if it appears in second level loops of a program, by a function F2. After defining the new function F2 and the condition that it has to occur in a second level loop, the parsed representation of the program is accessed in the data base. The search and replace procedure illustrated in FIG. 9A is applied. This search and replace procedure steps from item to item in the parsed representation of the program and identifies the item. If a match with the next search item is found 151, 152, 153, or 154 the search and replace procedure advances to the next step. If the search is completed, then the actual task, replace function "F1" with function "F2" 155 can be executed. This operation can be performed in a one pass or a two path operation as discussed above with reference to FIG. 2B. The operation is terminated 157 if the end of the file is recognized at step 156.

Once a parse tree is established the new parse tree query language of this invention can be used in a first step to search for and locate a selected term in the parse tree, and then, in a second step, the located term may be modified as needed using output instructions of the query language.

The SELECT instruction of the first step defines the term to be located in a specified parse tree and causes generation of a list of pointers to the selected terms. The list of term pointers can be output to a screen or printer, or used in the optional second step of the query.

The SELECT operation is a new method of navigating through the parse tree under consideration of the very specific structure of the parse tree. The parse tree includes roots, internal nodes, exterior nodes and tokens. Only the tokens contain information which may be part of the search term. All nodes are tied together by lists of pointers. These pointers relate to adjacent nodes, higher level nodes, lower level nodes, the root node, or a token. The end of a branch is reached when there is a pointer to a token. FIG. 7 is an schematic illustration of a section of a parse tree. FIG. 8A is an illustration of pointer information related to a node. It is understood to be within the skills of an artisan, that other pointers may be included to provide for additional references to other sections of the parse tree, or that some of the pointers may be omitted to reduce the amount of pointer data.

FIG. 11 is an illustration of an arrangement of memory stacks defining a state diagram during a search using the following search definition.

The following expression defines the desired path:

start_symbol ==> loop ==> loop+ ==> if_stmt ==> func_ref whereby:

"start_symbol" is the root of the parse tree.

"start_symbol ==> loop" selects those loops accessible from start_symbol such that there are no loop's in between them (i.e. the 1st loop detected after "start symbol").

"loop+" means one or more loops down inside the parse tree from each first loop encountered by start_symbol ==> loop The "if_stmt" is now at a place in the expression such that it will be in an inner loop of a depth of at least 2.

"func_ref" will be inside the if_stmt, and meets our specifications.

The state diagram of a search defines at any time what search items have been detected. "start" initiates the search which enters state "A" 1102 via a symbol linked to double arrow line 1100. The next search item is a loop statement 1104 to advance to state "B" 1106. Whenever the search advances from one state to another state the previous state and the next state are recorded in the state stack 1141 of the two states stack registers associated with the advance, as well as in the state advance stack 1131. This allows to backtrack a search path if a particular search statement has not been detected, and the search has to be continued in another branch of the parse tree. As indicated in FIG. 11 by the location of the registers relative to the state diagram the following register assignment support the operation:

| State | State Stack Reg. | Symbol | State Advance Reg. | Next State |
|---|---|---|---|---|
| Start |  | (1100) | 1130 | A |
| A | 1142 | loop_a | 1132 | B |
| B | 1144 | loop_b | 1136 | C |
| C₁ | 1146 | loop_b | 1136 | C |
| . |  |  |  |  |
| . |  |  |  |  |
| Cn | 1146 | if_stmt | 1138 | D |
| D | 1148 | func_ref | 1140 | E |

Each time the search has to backtrack the corresponding entries in the stacks are deleted, except if a search was successfully completed. Thus, at the end of a search the search results can be read from the stacks. State advance stack 1131 includes a section for each of the search statements in the search path. State stack 1141 includes a section for search state.

As demonstrated in FIG. 11, nested loops can be accommodated by use of a state stack, which stores the occurrence of nested loops, e.g., state C 1110 includes states C1 through Cn. Advancement from a state C1 to C2 occurs upon finding another loop statement of the same type and parameters as in loop 1108 (loop_b). The definition of the query language includes two types of nested loop escapes:

escape upon finding the next symbol escape upon finding the next symbol after n "loop_b" symbols.

Race Track Diagrams

A race track diagram is a graphical representation of a syntax rule. An arrow begins at the left, and ends at the right. In between there are boxes corresponding to the symbols on the right hand side of the rule.

If a symbol appears in the right-hand-side (RHS) of a rule, then there is an arrow entering a box corresponding to that symbol and another arrow exiting that box. If the symbol is optional in the rule, then there is an arrow bypassing the box corresponding to the symbol.

Thus, each rule is represented by an appropriate set of arrows, boxes, and other graphical entities that are easily visible to a person viewing the diagram.

Figure 9B:
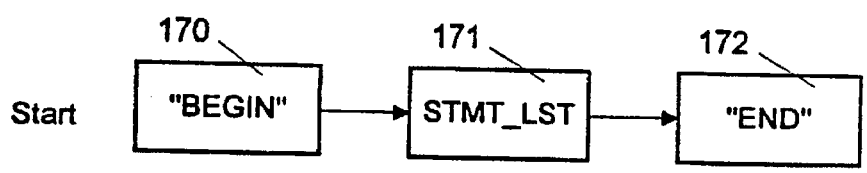
FIGS. 9B–9D is a illustration of the basic elements of the query language.
Figure 9C:
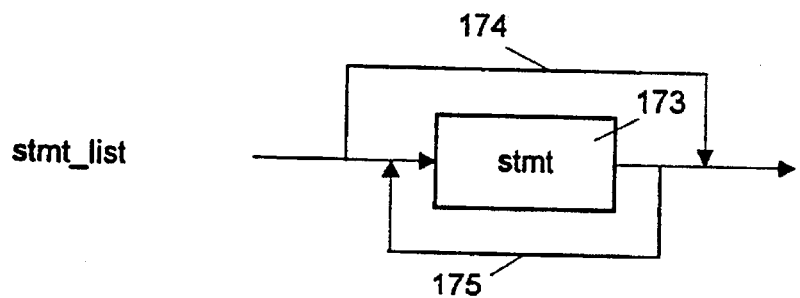
Figure 9D:
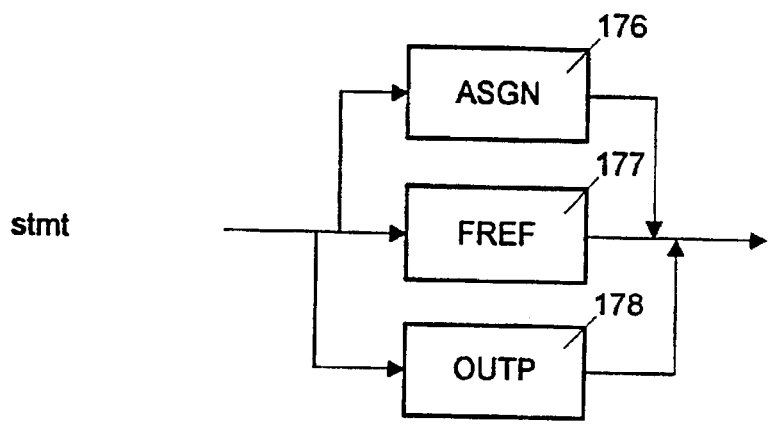

FIGS. 9B–9D are illustration of syntactacle elements of the demo query language. A query starts with "BEGIN" 170, includes a statements list STMT_LST 171 listing the statements to be looked for, and ends at "END" 172 (FIG. 9B). Expressions in quotes are reserved words of the particular language as defined in the syntax. A statements list includes statements 173 which cause bypassing 174 statements not searched for and statements repetitively search for 175, such as e.g. nested loops (FIG. 9C). A statement may be an assignment ASGN 176 or a function reference FREF 177, or an output function OUTP 178 (FIG. 9D), as defined in the syntax.

It is a straight forward project to build an implementation of a racetrack diagram in a Windows-based (such as MS-Windows, Motif, Macintosh, etc.) application.

In such an implementation a user can, using a standard pointing device (i.e. a mouse or a trackball), select a path graphically by navigating the symbols and rules of the compiled language, presented in the form of selection lists and race track diagrams.

By appropriately processing the user's actions, an implementation can build up a navigation expression which can then be handed off to an appropriate routine to compile the expression and build up a module that implements the expression.

Pattern Matching

A user can construct a search pattern syntactically, using standard regular expressions. For example, a simple variable name can be expressed as:

letter ::= [a-zA-Z]

alpha ::= letter | '_' digit ::= [0-9]

alpha_num ::= alpha | digit variable ::= alpha (alpha_num)*

One can also construct such expressions by the graphical construction of Finite State Automatons (FSA).

Our syntactic requirement may be more complex. Suppose we want loops within if_stmts within loops within if_stmts, nested in that combination to a depth of at least 2, with the condition that inner loops (within their if_stmts) are preceded by an assignment statement (asgn_stmt).

if_stmt inner_if;

loop inner_loop;

start_symbol ==> (if_stmt ==> loop) ==> (inner_if ==> inner_loop)+ && inner_if =+=> [* asgn_stmt * inner_loop * ];

Note that in the first set of parentheses, the specification is given via data types (i.e. symbols of the grammar), whereas in the 2nd set of parentheses, the specification is given with variable declared to be of data types corresponding to symbols in the grammar. This is so they can be specifically referred to later in the expression.

The double ampersand (&&) is, as in C, a logical "and".

The symbol "=+=>" means at least one level of expansion into the parse tree.

The square brackets indicate a partial expansion of the symbol to the left of the "=+=>", where the asterisks (*) are "wild cards", and the symbols within the brackets define a successful search in terms of the grammar of the language, and in terms of variables defined previously in the expression.

Suppose we have data types for ParseTree and symbols from a language specification. We can then write SQL-like statements in a C-like language to obtain queries of the form:

```
ParseTree pt;
func_ref fr, List frList;
pt = parse("somefile.c", "C");
frList = select func_ref from pt where
    start_symbol ==> loop ==> ( loop ) + ==> if_stmt ==> func_ref
for ( fr in frList )
{
    print ( fronttoken( fr ) );
}
```

Rewriting

Once a syntactic subset of a parse tree has been specified, a user may want that subset to be rewritten with some changes.

Let us assume that we have a default rewrite procedure for each node that rewrites the node's subtree exactly as it was upon input. An implementation can provide the capability of selectively overriding the rewrite procedures for a specified node or node type.

Suppose, for example, we wanted to change references to one function (say, F1) into references to another function (say, F2). This is a relatively easy task. However, suppose we ONLY wanted to change such function references when they appear WITHIN an INNER (nested) LOOP. This is a rather complex task, using traditional tools and methods.

Using tree navigation, however, we could code up the following example, in which we use primitive data types (such as ParseTree), derived type constructors (such as list), types corresponding to symbols of the grammar of the language of compilation, and variables of those types corresponding to selected nodes of the parse tree for the file being compiled.

Note, also, the use of C-like syntax of the parse tree navigation language, as well as the SQL-like parse tree node selection statement.

```
/*
    func_ref ::= func name_func_params;
    func_params ::= left_paren param_list right paren;
    etc.;
*/
void
Call_Me_F2(func_ref fr)
{
    Write("F2");
    Rewrite(fr.func_params);
}
void
Rewrite_F1_Becomes_F2(String FileName, String Language)
{
    ParseTree pt;
    func_ref fr, list frList;
    pt = Parse(FileName, Language);
    frList = select func_ref from pt
        where
            fronttoken(fr.func_name) == "F1"
        and
            start ==> loop ==> loop+ ==> fr ;
    for fr in frList
    {
    PushRewriteProc(fr, Call_Me_F2);
    }
    Rewrite(pt);
    for fr in frList
    {
    PopRewriteProc(fr);
    }
}
```

As indicated above, the list of term pointers generated in the first step can be used in the second step, the modification of the term, whereby it is understood that a modification may include deletion of the term. This second step TRAVERSE instruction steps through the parse tree using the list of pointers generated in the first step and executes the modification instruction. Upon execution of the desired modification the resultant modified parse tree module can be re-constructed into a source program module. This source program module can be used as a substitute for an existing source program module, or it may replace an existing source program module.

The following demonstrative example illuminates the various aspects discussed above.

Presented here is with reference to FIGS. 10A through 10G, as a demonstrative example of a small program and a query. The small program is hereinafter referred to as the "Demo-Program". The example is demonstrated with the language, the program, its parse tree and the query operation. While the demo program is simple and short its parse tree is not as simple.

First, a few words regarding the language and its definition:

The statement "Start (program)" declares the symbol, program, as the start symbol of the language grammar.

The Pattern statement declares the structure of the tokens (all uppercase) VAR and CONST, which correspond, here, to variable names and integer constants.

The remaining rules are syntactic expressions, with character string laterals used to denote operators and keywords ("if", "while", '+', etc.).

The Language of the Demo-Program

Tokens and reserved words are defined as follows:

```
Token VAR [A-Za-z_][A-Za-z_0-9]*
Token CONST [0-9]+
Token AEQ '='
Token COMMA ','
Token LC '{' , RC '}'
Token LP '(' , RP ')'
Token LT '<' , GT '>' , EQ "=="
Token PLUS '+'
Token SC ';'
Reserved IF "if" , WHILE "while"
Start ( program )
program ::= stmt_list
stmt_list ::= stmt *
stmt ::= if_stmt | loop | asgn SC | func_ref SC |
    LC stmt_list RC
if_stmt ::= IF LP cond RP stmt
loop ::= WHILE LP cond RP stmt
cond ::= expr condOp expr
condOp ::= LT | GT | EQ
asgn ::= VAR AEQ expr
expr ::= CONST | VAR | func_ref | expr PLUS expr
func_ref ::= func_name LP param_list RP
func_name ::= VAR
param_list ::= NOTHING | param ( COMMA param ) *
param ::= VAR | CONST | func_ref
The Demo-Program:
y = F1 ( x );
x = 0;
while ( x < 3 )
{
    print ( F1 ( x ) );
    x = x + 1;
}
i = 0;
while ( i < 10 )
{
    j = 0;
    while ( j < 20 )
```

-continued

```
    {
        z = F0 ( i, j );
        if ( z > 5 )
        {
            w = F1 ( x );
            print ( w );
        }
        j = i + 1;
    }
    i = i + 1;
}
```

FIGS. 10A through 10G are schematic illustrations of the parse tree of the above Demo-Program.

A Simple Query Applied to the Demo Program

Suppose a list of references to the function F1 is to be generated. But only if such references to function F1 are of interest if the function occurs within a conditional statement inside a nested loop. That is, the reference has to be part of a conditional statement and be within a loop inside another loop i.e. a loop whose nesting level is greater than or equal to 2.

In the above Demo-Program there are 3 references to function F1, but only the 3rd one of these references fulfills the search criterium.

In a real program one might have to search from hundreds of files, each containing more that thousands of lines of code. Thus, while the Demo-Program is easy to oversee, a real program is a much more difficult task to do by hand, if not economically unreasonable. Thus, the present invention provides the means for performing such search tasks even on regular tasks.

To have this task done by in a computer environment a search specification can be written based on the definition of the used language. The above search specification for F1 can be written as follows.

```
select func_ref from program
    where
        program ==> loop ==> loop + ==> if_stmt ==> func_ref
        and
        func_ref ==> func_name ==> VAR == "F1";
```

This query defines the task to search for a function reference which is to be found following a conditional statement "if"inside of at least a nested loop. The function reference searched for is defined as variable F1. This query does not include any instructions for what to do if such a function F1 is found. Therefor the query will only determine where in the parse tree of the Demo-Program the function F1 is located.

The search starts at the root of the tree and follows a path on which it encounters the search criteria in the sequence of the search specification until it finds the proper function "F1". Each time a function "F1" in at least a second nested loop is found, the proper reference number of the particular node of the function is listed.

The Parse Tree of the Demo Program

To assist in accurately depicting tree fragments, each one of the nodes of the parse tree carries at least one reference number, so that we know where a fragment is connected to in the parse tree as a whole. The actual sequence of entries of the Demo-Program listed above is:

(LF = linefeed, TAB = Tab command):
y = F1(x); LF LF x = 0;
LF LF while (x < 3) LF{LF TAB print(F1(x));
LF TAB x = x + 1; LF}LF i = 0;
LF while(i < 10)LF{LF TAB j = 0;
LF TAB while(j < 20)LF TAB{LF TAB TAB z = F0(i,j);
LF TAB TAB if(z > 5)LF TAB TAB{LF TAB TAB TAB w = F1(x);
LF TAB TAB TAB print(w);
LF TAB TAB}LF LF TAB TAB j = j + 1;
LF TAB}LF LF TAB i = i + 1; LF LF}

In a line-by-line representation of the above shown entry sequence is shown below with reference to the appropriate drawing.

| Demo-Program | Drawing |
| --- | --- |
| LF y = F1 ( x ) | 10B |
| LF LF x = 0; | 10B |
| LF while ( x < 3 ) | 10C |
| LF { | 10C |
| LF TAB print ( F1 ( x ) ); | 10C |
| LF TAB x = x + 1; | 10C |
| LF LF } | 10C |
| LF LF i = 0; | 10B |
| LF while ( i < 10 ) | 10D |
| LF { | 10D |
| LF TAB j = 0; | 10D |
| LF TAB while ( j < 20 ) | 10E |
| LF TAB { | 10E |
| LF TAB TAB z = F0 ( i, j ); | 10E |
| LF TAB TAB if ( z > 5 ) | 10F |
| LF TAB TAB { | 10F |
| LF TAB TAB TAB w = F1 ( x ); | 10F |
| LF TAB TAB TAB print ( w ); | 10F |
| LF TAB TAB } | 10F |
| LF LF TAB TAB j = j + 1; | 10G |
| LF TAB } | 10E |
| LF LF TAB i = i + 1; | 10D |
| LF LF } | |

For simplification purposes LF and TAB are not included in the parse tree. Wherever they occur, they will be represented by a node and a token.

FIGS. 10A through 10G are illustrations of the parsed tree without any additional commands entered to improve readability, such as indentations by TAB commands and linefeed commands.

FIG. 10A is an illustration of the root of the deviation tree. Following the program-name 1000 is a statement list 1002. Statement list 1002 has 5 entries, statements 1004, 1006, 1008, 1010, and 1012. These statements are referenced in the node of the statement list by pointers to the first statement 1004 and the last statement 1012. Statements 1006, 1008, and 1010 are referenced by pointers in the adjacent statement node, thus providing a chain of statements.

Figure 10B:
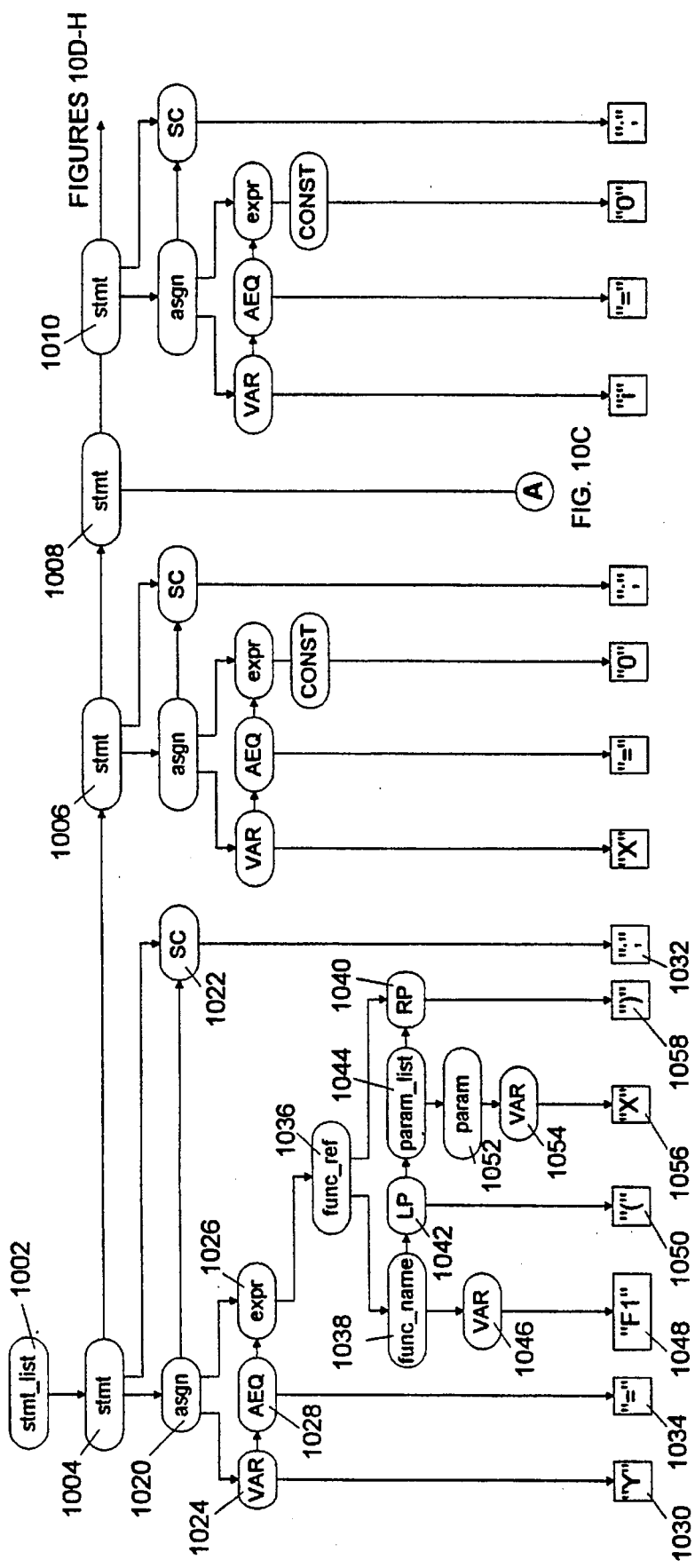
Figure 10C:
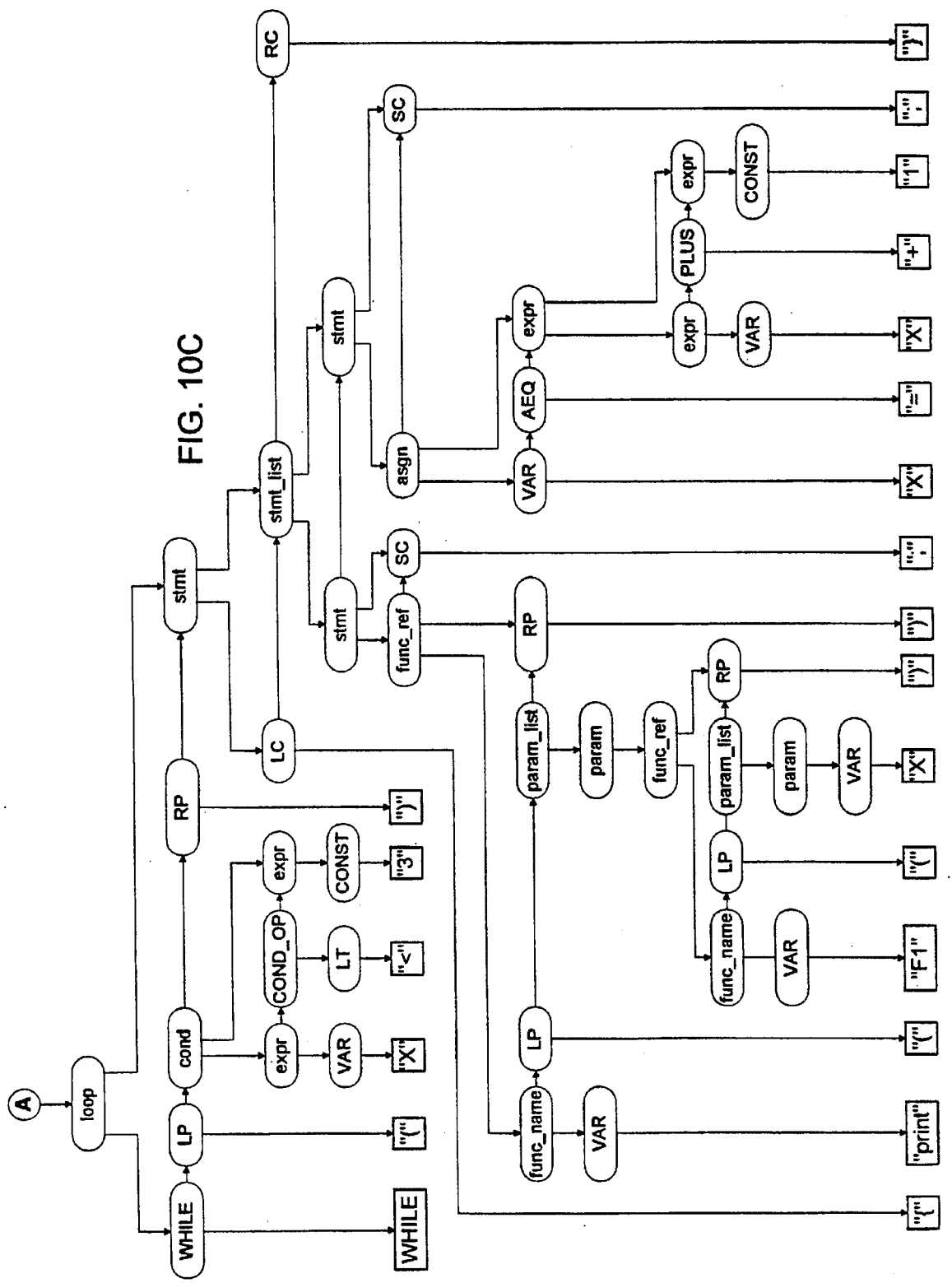
Figure 10D:
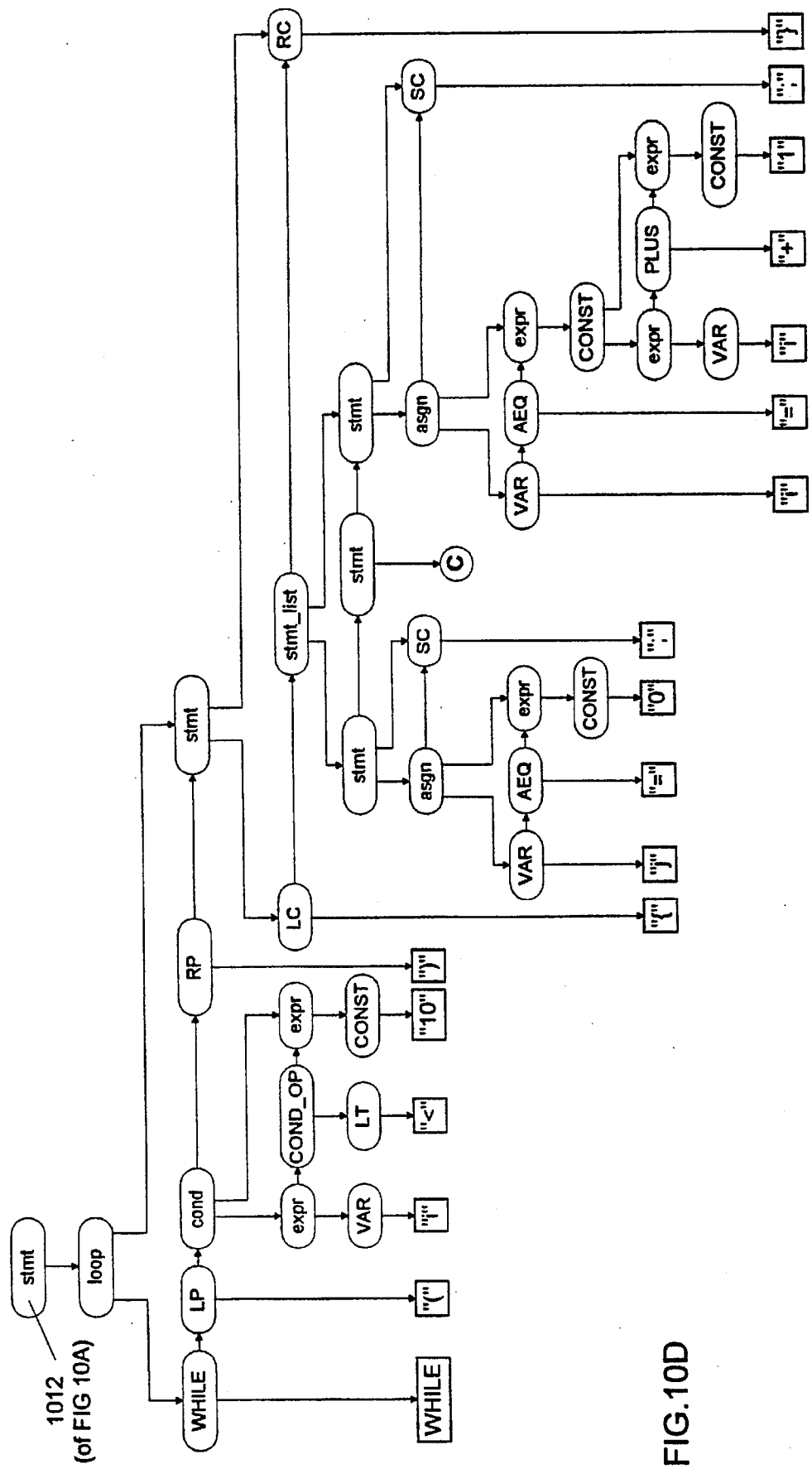
Figure 10E:
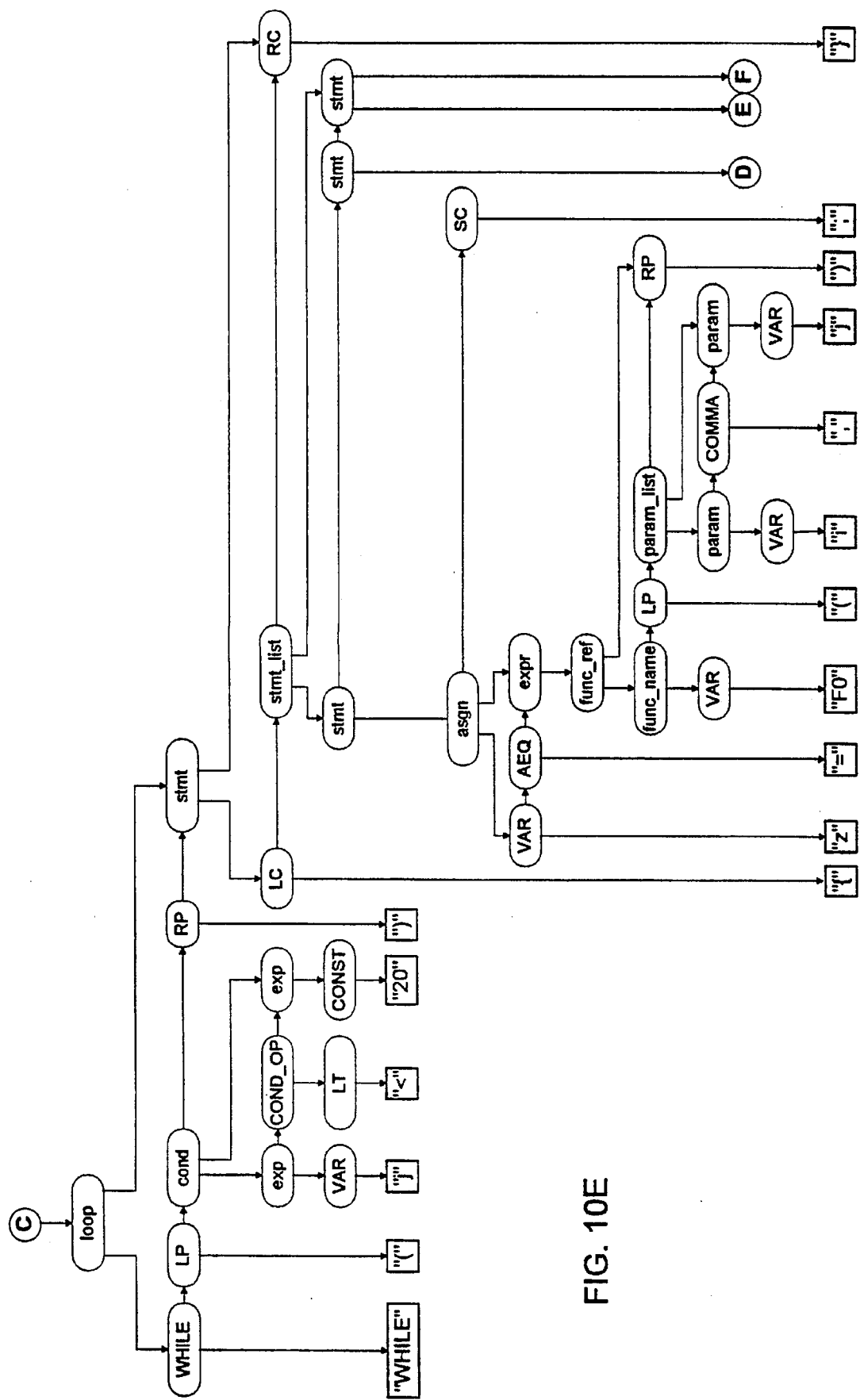

The following description refers to the section of the parse tree shown in FIG. 10B, which relates to the line entries line 1: Y=F1(X);
line 2: X=0;
line 8: i=0;.

The first line entry is disclosed here in detail. Details of the parse tree for entries in lines 3 through 7 are shown on FIG. 10B.

Statement 1004 includes a left pointer to node "asgn" 1020 and a right pointer to node "SC" (semicolon) 1022. Node "SC" references by pointer token ";" 1032. Node "asgn" 1020 includes a left pointer referencing node "VAR" 1024, and a right pointer referencing node "expr" 1026. Node "VAR" 1024 and node "expr" 1026 are chained by node "AEQ" 1028. Node "VAR" 1024 is identified a token "Y" 1030, and node "AEQ" 1028 is identified by pointer symbol token "=" 1034. Expression node "expr" 1026 references a pointer function reference node "func_ref" 1036. A function reference has a function name and parameters, enclosed in parentheses. Thus node "func_ref" 1036 includes a left pointer reference to node "func_name" 1038 and a pointer reference to node "RP" 1040. Node "LP" 1042 and node "param_list" 1044 complete the chain between nodes 1038 and 1040. Node "func_name" 1038 references by pointer node "VAR" 1046 which in turn references by pointer token "F1" 1048. Node "LP" 1042 points to token "(" 1050. Node "param_list" 1044 references by pointer node "param" 1052, which in turn references node "VAR" 1054. Node "VAR" 1054 references by pointer token "X" 1056. Node "RP" 1040 references by a pointer token ")" 1058.

This completes the parsing of the first line of the demo-program "y=F1(x);". The parse tree sections relating to the remaining lines of the demo program are shown in FIGS. 10B through 10G.

As discussed above the demo program includes a function "F1" which is to be found using the following query statement.

program ==> loop ==> loop+ ==> if_stmt ==> func_ref
and
func_ref ==> func_name ==> VAR == "F1";

The search for function F1 scans every branch of the parse tree starting at node 1000. If the search does not recognizes a loop in a branch, it returns to the level which allows access to another branch. In the example all branches are at the same level. However, this does not have to be in other parse tree. Searching in a branch stops when a node of a branch or all nodes of a subtree are exterior nodes.

Figures 10F, 10G:
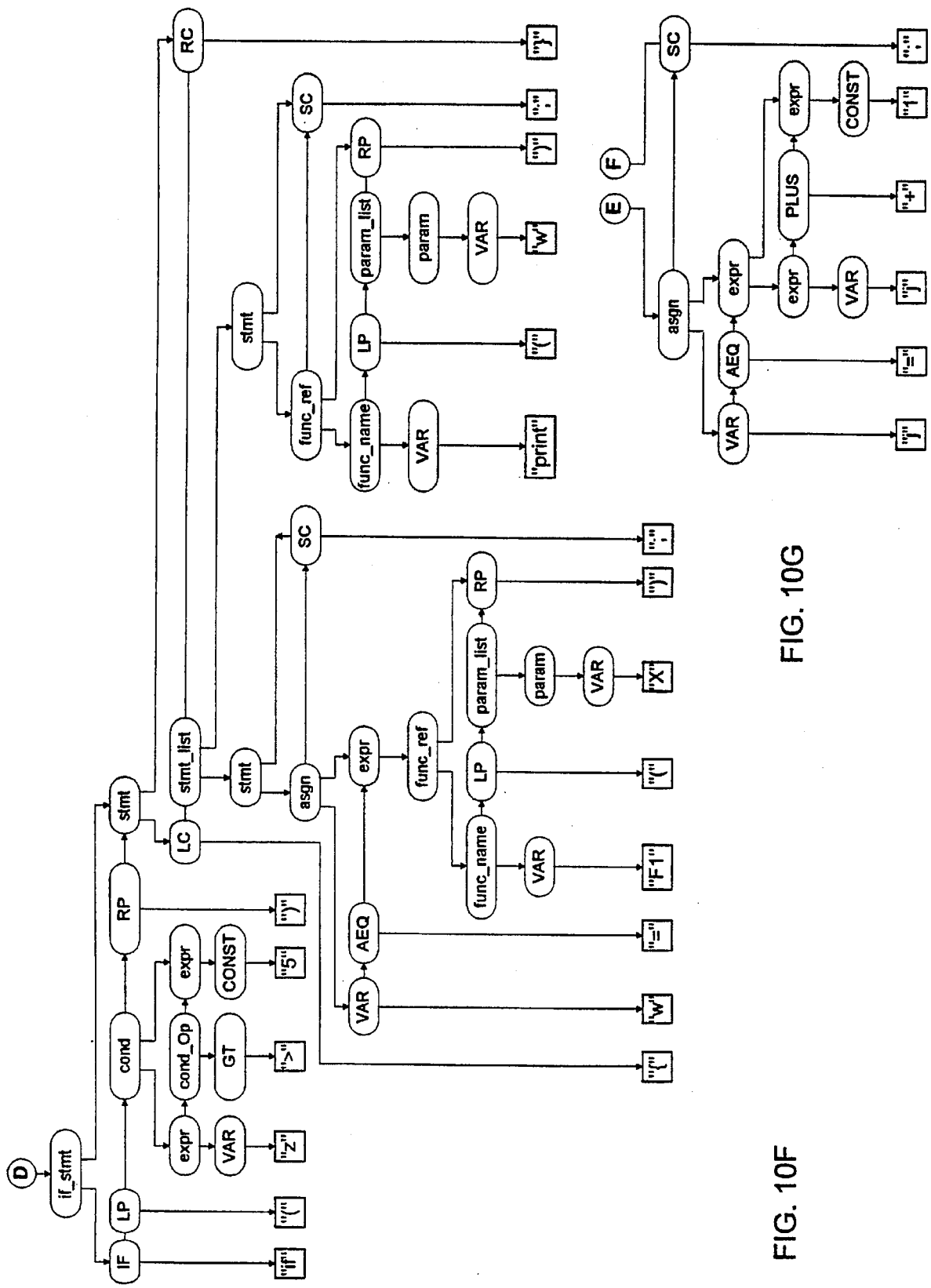

In the example the search becomes successful after a first loop, a second loop inside the first loop, and a conditional statement were recognized prior to hitting a token "F1" (see FIG. 10F). The search progresses as follows.

The query program discussed above has to find the occurrence of "F1" 1050 on FIG. 10F. The search will eventually reach "stmt" 1012 FIG. 10A and FIG. 10D. The following item is a node "loop" 1054, pass through node "stmt" 1056, page connector "C" to FIG. 10E, where the second "loop" node 1058 is recognized. "if_stmt" 1051 in FIG. 10F is reached in the search via page connector "D" 1060. The parse tree branch of FIG. 10F starting with node "if_stmt" 1051 branches out into the assignment statement "asgn" 1053 which includes function reference "func_ref" 1053, which includes the function name "F1" 1050. The pointers of the found search item are stored and the search continues through the remainder of the parse tree.

Instead of just listing the occurrence of the search item under specified conditions, the query may include directions to modify the program by changing the search item, adding new program instructions or deleting instructions. Such a direction may then be followed by an instruction to create a modified new object module which may used in place of the original object module.

Query Processing

Establishing the expansion tree with the pointers linking related nodes and tokens is the base requirement for the query operation. There are a number of queries of different levels of complexity. The simplest query establishes a list of the occurrences of a sequence of symbols.

The particular query may be defined by entry of query language statements or by entry of a state diagram as shown in FIG. 12A. Such a state diagram has a start node 1202 and an end node 1208. Nodes may be looped, with and without limitation. Nodes are linked by the symbols defining the query path.

While the query processor scans the expansion tree it establishes for every node it passes through in forward motion for the next node a temporary list of references defining the path taken through the expansion tree up to the present state of the query search. Upon finding an element listed in the query the processor advances the state in the state diagram. If the query processor reaches the end state or accept state, in the state diagram, it enters into a result list the address of the node at which the processor reached the end state. The processor steps backwards in the expansion tree, changes the state in the state diagram accordingly and erases the entries in the temporary list once it steps to a preceding node. The original forward path is traced back through the node in accordance with the information contained in the temporary list. Once the back tracing reaches a node which offers a different forward path than previously taken (see FIGS. 8A and 8B), the query processor will follow this forward path to determine whether this path includes symbols which would advance the state to the next state of the state diagram.

The result of the query operation is a result list containing information on all the nodes which advanced the state of the query process to an accept state. This information may be printed out for later use, or it may be used in modifying the source code directly or in regeneration of the source code by a suitable process.

There are several methods for generation of source code using the result of the query and the expansion tree.

1) Read the expansion tree, generate another source code, and when coming across a node referenced in the result list execute the desired code modifying operations;
2) Access the expansion tree code in accordance with the result list and execute the desired code modifying operations, thereby creating a new expansion tree prior to the generation of new source code;
3) Generate one or more copies of the expansion tree or sections thereof and execute the desired code modifying operations, following either method 1 or method 2.

Code Expansion

Figure 14A:
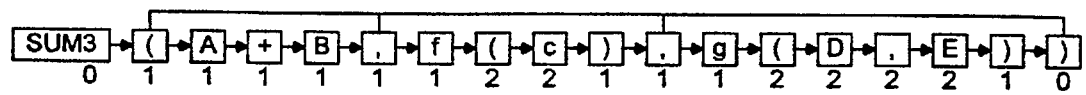
FIGS. 14A through 14C are illustrations of syntactical and structural expansion and the nodal links during an expansion operation.

FIGS. 13A through 13E and 14A through 14C are schematic illustrations of the expansion operation performed in the preprocessor of the present invention. FIG. 14A is an illustration of the original statement and the definitions used in the three expansion operation. It is understood, that many more definitions are available for expanding all allowed possible statements.

The original statement SUM(A,B,C) is covered by definition of SUM3(X,Y,Z), which equates to X, ADD2(Y,Z). Thus the sum of three elements is expanded to a first element and the addition of two element. The latter expands to two additions of each one element, each expanding to adding one element.

FIG. 13B is a schematic illustration of the first level expansion of the expression SUM3 as applied to the original statement. The dotted squares indicate pointers linking the actual elements of the statement to the element of the definition.

FIG. 13C is a schematic illustration of the first level expansion of the expression ADD2 as applied to the original statement. The dotted squares indicate pointers linking the applicable actual elements of the statement to the element of the definition.

FIG. 13D is a schematic illustration of the first level expansion of the expression ADD1 as applied to the original statement. The dotted squares indicate pointers linking the applicable actual elements of the statement to the element of the definition.

FIG. 13E is a schematic illustration of the first level expansion of the expression SUM3 as applied to the original statement. The dotted squares indicate pointers linking the applicable actual elements of the statement to the element of the definition. In this example it is assumed that there is an extra space between element "ADD2" and element "(". The space is represented in the expansion by a space token with the symbol "...".

Figure 14B:
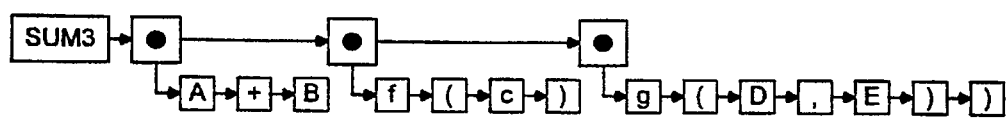
Figure 14C:
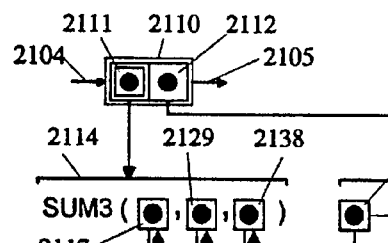
Figure 14C:
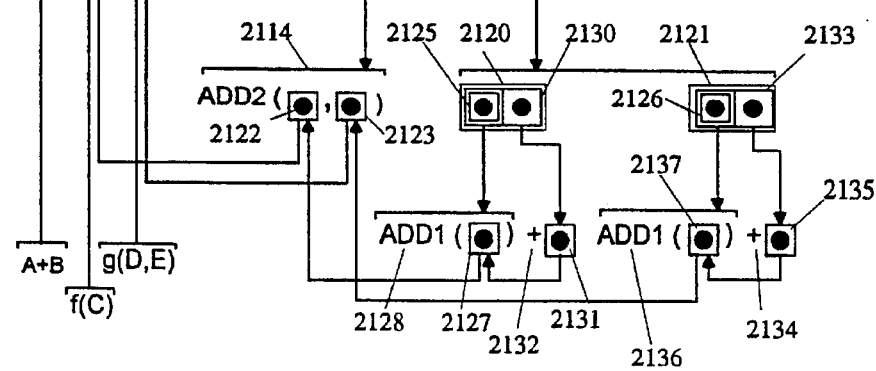

FIGS. 14A through 14C are schematic illustrations of the expansion of the statement SUM3(A+B,f(c),g(D,E)). The syntactic expansion results in the symbolic expression shown in FIG. 14A, a sequence of the elements of the statement. Below the expanded sequence is a level indication showing the number of opening parenthesis symbols encountered during expansion.

FIG. 14B is a schematic illustration of the structural expansion of the same statement. It shows a section for each element of the statement. Note, that in going from syntactical to structural expansion commas and parentheses are replaced by groups separated by pointer access.

FIG. 14C is a schematic illustration of the expansion process, in which there are two types of dotted squares: a single line square and a double line square. Double line squares relate to expressions to be expanded; single line squared relate to the arguments of the expression or expansion elements. In FIG. 14C the statement to be expanded is SUM3(A+B,f(c),g(D,E)) 2110. Statement 2110 is part of a sequence of statements as indicated by arrows 2104 and 2105. The first part 2111 SUM3 of statement 2110 is expanded to the definition 2114 which requires three elements 2117, 2129, and 2138 in the argument of the statement. The second part (A+B,f(c),g(D,E)) 2112 of statement 2110 is expanded to a first expanded element 2113 and an ADD2 expression 2115. The first expanded element includes a reference pointer 2116 to the first argument 2117 of SUM3 definition 2114. The ADD2 expression 2115 includes a first part 2118 which references definition 2114 of the ADD2 expression, and a second part 2119 which is expanded to two expressions 2120 and 2121. Definition 2114 includes the function type ADD2 and two arguments 2122 and 2123. Expressions 2120 and 2121 are ADD1 type functions, whereby element 2120 relates to the addition of the f(c) element and element 2121 relates to the g(D,E) element of the original statement 2110, as can be recognized by following arrows until the strings are reached. Definitions 2125 and 2126 both expand to an ADD1 function 2128, resp. 2136, with each one element 2127, resp. 2135. The second part 2130 of element 2120 expands to a "+" symbol 2132 with one element 2131, which includes a pointer to the definition element 2127 of the associated ADD1 function 2128. Element 2127 in turn includes a pointer to element 2122, which in turn includes a pointer to the second element 2129 of the definition 2114 of SUM3. The second part 2133 of element 2121 expands to a "+" 2134 with one element 2135, which includes a pointer to definition element 2137 of the associated ADD1 function 2136. Element 2137 in turn includes a pointer to element 2123, which in turn includes a pointer to the third element 2138 of the definition 2114 of SUM3.

Thus, the expansion operation analyzes each and every macro-instruction in accordance with the applicable syntax and provides a structural representation in which each token or element of the expanded representation is linked directly or indirectly to the original macro-instruction. These linkages provide the basis for scanning the expansion tree, generating a modified secondary expansion tree, and for regeneration of source code from a secondary expansion tree.

Figure 15:
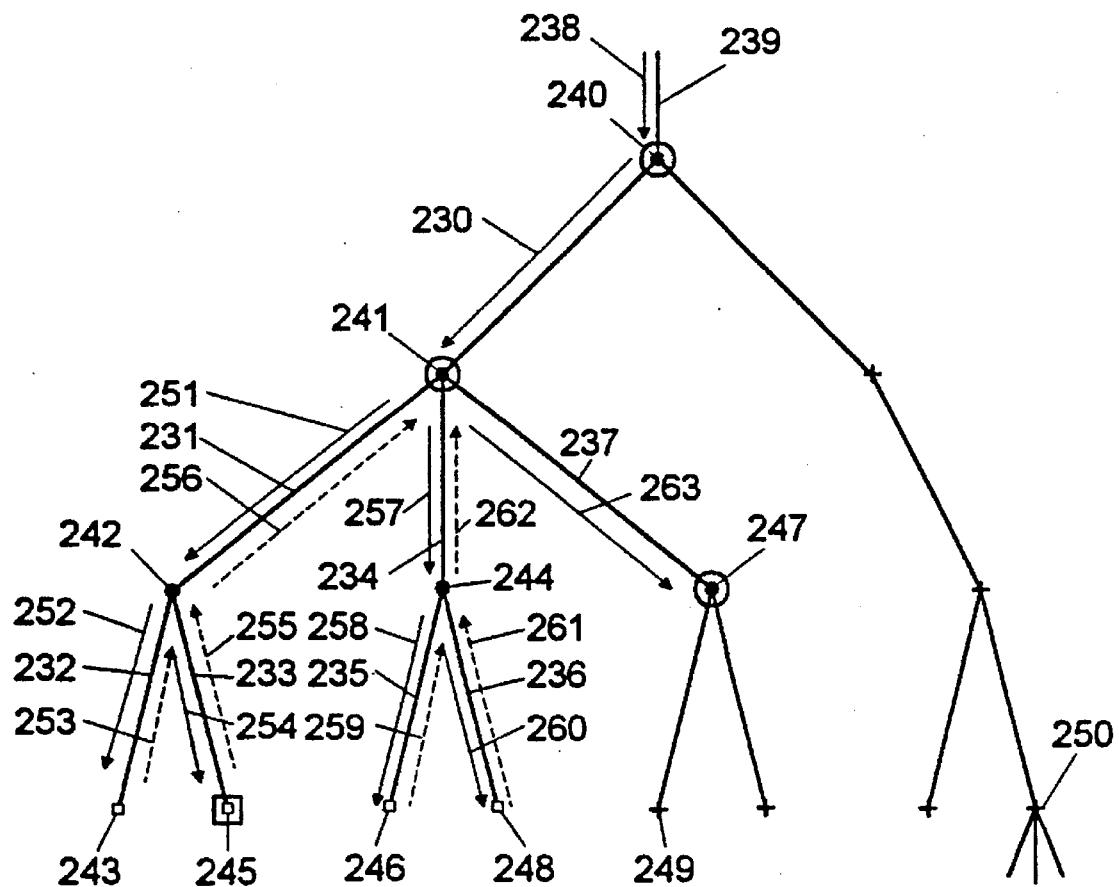
FIG. 15 is a schematic illustration of the parse tree scanning operation sequence.

FIG. 15 is a schematic illustration of the scanning of an expansion tree section during a query operation. This scan operation makes use of the state stack and the state advance stack, which were already disclosed with regard to FIGS. 12A and 12B. The scan advance status for the expansion tree is monitored by the node advance stack, which contains al information of the direct path from the root of the tree to the present scan position. Sequencing a plurality of branches extending from one node is defined by node information, as disclose with respect to FIGS. 8A and 8B.

For this demonstration it is assumed that node 240 is a node the scanning operation has reached when traversing the tree in an advance 239 and forward scan operation indicated by solid arrow 238. Node 240 is entered into the node advance stack containing references of not discarded nodes. The next scanning step is to advance to the next node 241 in forward direction as indicated by solid arrow 230. Node 241 is entered temporarily into the node advance stack. The next scanning step is to advance to node 242 in forward direction as indicated by solid arrow 251. Node 242 is entered into the node advance stack. The next scanning step is to advance to the next node 243 in forward direction as indicated by solid arrow 252. Node 243 would be entered into the stack of accepted nodes if the query condition is fulfilled. It is assumed that this is not the case. Therefore, node 243 is again removed from the node advance stack, and the next scanning step is to retreat to the preceding node 242 in reverse direction as indicated by dashed arrow 253. Node 242 is still in the node advance stack. A forward scanning step to node 245 as indicated by solid arrow 254 is used to check node 245. It is assumed that node 245 fulfills the query condition, therefore it is permanently entered into the accepted state stack, as indicated by the square notation at node 245. The next scanning steps retreat to preceding nodes 242 and 241 in reverse direction as indicated by dashed arrows 255 and 256 respectively. Node 242 is discarded from the node advance stack. Reaching node 241 another branch to be traversed in forward direction is detected, and the scan moves forward, indicated by solid arrows 257 and 258 to nodes 244 and 246, respectively, which nodes are temporarily entered into the node advance stack. Assuming that none of the nodes fulfills the query condition, the scan is reversed as indicated by dashed arrow 259, node 246 is removed from the node advance stack. At stack 244 the scan changes to forward scan to node 248 as indicated by arrow 260, where it is assumed for this demonstration that the query condition is not fulfilled. For this reason the scan reverses following dashed arrows 261 and 262, passing through node 244, which is discarded from the node advance stack. At node 241, which is still in the node advance stack, the scan steps forward in direction of solid arrow 263 to node 247, which is now entered into the node advance stack.

At this moment the node advance stack contains references to all nodes leading in the expansion tree directly to node 240, and the nodes 240 and 241, which lead directly to node 247, the present state of the scan. Nodes 242, 243, 245, 244, 246, and 248 were once member of the stack of not discarded nodes, but have been discarded when the scan proceeded to other sections of the branch (they are marked by dots). Node 245 was recorded in the accepted state stack as indicated by the square marking. When retreating from node 245 to nodes 242 and 241 the state stack and the state advance stack are corrected accordingly, so that at any time the stacks show the proper state for advancing the scan in forward direction in search for a condition fulfilling the query condition. Nodes not yet scanned are marked by "+" signs.

FIGS. 16A through 16D are illustrations depicting the principles of the search operation. There are two types of searches. First there is the search for occurrences of selected symbols, see FIG. 16A. This type of search is followed up in FIGS. 16A through 16D by state machine SM1. Secondly, there is a contextual search for selected references, see FIG. 16C. This type of search is followed up in FIGS. 16A through 16D by state machines SM2 and SM3. The difference between these two types of searches is in the use of the search result at the end of the expansion tree search operation. The first type of search scans through the branches of an expansion tree and lists where the search criterium is fulfilled. The contextual search provides for a conditional enables of the first search if the search criterium is fulfilled in a defined section of the expansion tree, whereby the defined section does not have to be part of the same branch in which the first type of search was successful.

FIG. 16A is a state diagram of a search, in which an "IF" has to be found to advance to state "1". A "LOOP" has to be recognized in the continuous forward search to advance to state "2". The contextual searches are defined by the state diagram of FIG. 16C. State machine SM2 advances upon recognition of a "FREF". State machine SM# advances upon recognition of a "ASGN".

Using the section of an expansion tree of FIG. 16B it is assumed that all the searches reached node N0 in state S0. Advancing to node N1 state machine SM1 advances to S1. Advancing to node N4 does not change the states. Upon returning to node N1, advancing to node N5 keeps the states of the state machines. However, when reaching node N8 state machine SM1 advances to S2. The completion of the search criterium is noted in a listing. The search advances to follow-on branches and returns to node N8, Upon reaching node N5 on the return state machine SM1 return to state S1. Returning to node N1 places state machine SM1 into state S0. State machine S1 will remain in state S0 during the following search passing through nodes N2, N3, N6, N7 and the return to node N0. However state machine SM2 will assume state S1 upon reaching node N2 and remain in state S1 until it leaves node N2 on the return path. The occurrence of state machine SM2 reaching state S1 is noted in a state machine SM2 listing. State machine SM3 never leaves its state S0 in this search operation.

Depending on the search criterium a contextual search can be used to enable or disable the listing generated under control of state machine SM1. This could be expressed as (criterium of SM1) AND (criterium of $SM_{>1}$)

or (criterium of SM1) AND NOT (criterium of $SM_{>1}$).

FIG. 16D is tabular representation of the states of state machine SM1 and SM2 while scanning the expansion tree section of FIG. 16B using state diagrams illustrated in FIGS. 16A and 16C.

This method of scanning allows to traverse an expansion tree, relate the discovered nodes to the query condition and advance the scan state accordingly. All information required to decide at a node which branch to take first or next after a return from a sub-branch, are contained in the information related to the particular node as already disclosed with regard to FIGS. 8A and 8B.

While the present invention was disclosed with respect to a parsed tree of a source code, the same operations can be applied to other areas of program generation as long as the particular object is developed into a parse tree like structure, and the query processor has access to that structure. Such access is easily provided for structures which are developed during other phases of program generation such as a macro expansion tree, jumping to other files following statements such as "include file" during preprocessing (symbol # in C-preprocessor) and additional conditional partial compilation functions.

The present invention has been disclosed with respect to its application in program generation and modification. However, the principle of generating a parse tree in combination with an appropriately modified query language make this invention applicable in many other areas. The present invention is applicable to any type of structure which can be expanded into a tree, and where direct access to an individual element of the tree is not possible because it is unknown how to access it, or where the path to the element is known but access is very cumbersome to implement. The later is the case in many computer assisted design tasks, where elements are known by their access path, however, when changing a certain type of elements or their parameters the task of accessing the individual elements is cumbersome. In such an application the accept state may end at any level in the design, i.e. any node may become an accept state, and any accept state must be combinable with functional parameter table, including models representing the element of the accept state.

Establishing a list of elements in an accept state list and applying in a second operation or in the same operation a process of modifying the element of the accept state simplifies and speeds up the design process. This process is applicable to mechanical as well as electrical designs and the design of complex integrated circuits.

Other Areas of Application

Simulation of functions of VLSI devices prior to commitment to silicon, is another application area where the present invention provides significant advantaged. In such simulation operations stimuli are applied to various externally accessible signal points as well as to internal storage elements to start simulation operation under predetermined start conditions. There is a need for accessing stimuli signals as well as behavior tables for elements in order to modify operational conditions, such as start conditions, signal specifications, as well as behavior parameters of elements. In such applications, there are cases where only selected ones of a certain type of signals or behavior parameters are to be changed. The possibility to name such signal or behavior by even a fractional path to establish a group and then execute the modification, will simplify the otherwise very tedious task.

What I claim is:

1. An apparatus for searching and modifying a source code of a computer program written in a programming language for controlling operation of a computer, said source code including program language symbols defined in said programming language and application symbols defined in said source code, comprising:

a memory including
      a first storage for storing said source code program;
      a second storage;
      a compiler for translating said source code program into a parsed representation of said source code and storing said parsed representation in said second storage;

first means for traversing said parsed representation;
   a third storage for storing a search term including at least one of said symbols,
   said first means for traversing including means for applying said search term to said parsed representation, and means for identifying occurrences and first locations of said symbols equal to said at least one of said symbols in said parsed representation; and
   a fourth storage for storing a list of said first locations.

2. An apparatus as claimed in claim 1, further including fifth storage for storing a first program term including at least one new program symbol and instructional information for handling said new program term in combination with said parsed representation;
   second means for traversing said parsed representation for generating a new source code from said parsed representation and applying said first program term upon recognizing one of said first locations in said parsed representation under control of said instructional information;
   thereby generating a new source code including said first program term at locations defined in said listing of said first locations and said instructional information.

3. An apparatus as claimed in claim 2, wherein said second means for traversing inserts said first program term into said otherwise unchanged source code, thereby providing said new source code.

4. An apparatus as claimed in claim 2, wherein said second means for traversing replaces a second program term in said source code with said first program term in said otherwise unchanged source code, thereby providing said new source code.

5. An apparatus as claimed in claim 2, wherein said second means for traversing deletes a second program term in said otherwise unchanged source code, thereby providing said new source code.

6. An apparatus as claimed in claim 1,
   further including fifth storage for storing a first program term, said first program term including at least one of said symbols;
   means for replacing in said parsed representation a second program term of said source code with said first program term at a predetermined second location associated with said first location;
   means for constructing a new source code using said parsed representation including said new program term.

7. An apparatus as claimed in claim 1 further including
   means for deleting a first program term at a predetermined location associated with said first location from said parsed representation;
   means for constructing a new source code using said parsed representation without the deleted search term.

8. An apparatus as claimed in claim 1 further including
   a fifth storage for storing instructional data;
   means for modifying said parsed representation in accordance with said instructional data;
   means for constructing a new source code using said modified parsed representation.

9. An apparatus as claimed in claim 1,
   wherein said source code contains program symbols, space codes and non-instructional codes,
      said apparatus further including a preprocessor for syntax checking of said source code;
      said compiler retaining said non-instruction codes while generating said parsed representation of said source code, said parsed representation of said source code including parse information for reconstructing said source code from said parsed representation of said source code.

10. A method for generating a parse tree for a source code including instructional codes and non-instructional codes, generating a parsed source code and using said parsed source code for constructing a new source code, said parse tree having a root, branches and levels, comprising the steps of parsing said source code, said parsing including the sub-steps of generating nodes and tokens in different levels of said parse tree and providing for each of said nodes and tokens pointers for referencing adjacent nodes and tokens in the same level or adjacent levels of the same one of said branches; and marking said non-instructional codes at adjacent instructional nodes.

11. A method for generating a parse tree for a source code programs including instructional codes and non-instructional codes, and using said parsed source code for constructing a new source code, said parse tree having a root, branches and levels, as claimed in claim 10, wherein said parse tree includes branch-roots, and wherein said step for parsing provides pointers for each of said nodes and pointers for referencing associated once of said branch-roots.

12. A method for determining the location a program term in a source code of a computer program using a predetermined event in said source code for identifying said program term, said method comprising the steps of generating a parse tree including all program terms of said source code program, said parse tree including nodes and tokens, each of said nodes and each of said tokens including pointers identifying said nodes and tokens within said parse tree;

generating a definition of said predetermined event in a query language of said parse tree;

recording the occurrence of said predetermined event using said identifying pointers of said nodes and said tokens constituting said event.

13. A method for modification of a program term in the source code of a computer program using a predetermined event in said source code for identifying said program term, said method comprising the steps of generating a parse tree including all program terms of said source code, said parse tree including nodes and tokens, each of said nodes and each of said tokens including pointers identifying said nodes and pointers within said parse tree;

generating a first definition of said predetermined event in a query language of said parse tree;

providing a modification definition for modifying said program term;

recording occurrences of said predetermined event using said identifying pointers of said nodes and said tokens constituting said event, applying said modification definition upon recognition of said predetermined event while generating a new source program from said parse tree.

14. A parse tree query language for performing a search in a source code parse tree of a program written in a high level language, using at least one search term including symbols defined in said language, said language including means for identifying at least one sequence of statement symbols to be searched for, said language comprising means for identifying statement symbols, means for identifying a sequence of occurrence of selected ones of said statement symbols, and means for identifying single and multiple occurrences of said selected once of said statement symbols.

15. A parse tree query language for performing a search of a parse tree of a high level program for at least one predetermined term as claimed in claim 14, wherein said language further comprises means for specifying a desired operation to be performed in response to a query using said parse tree.

16. A parse tree query language for performing a search of a parse tree of a high level program for at least one predetermined term as claimed in claim 15, wherein said language further comprises means for specifying modification operations to be performed using said parse tree, said modifications including adding, deleting or substituting selected terms included in said parse tree, and providing a new, modified parse tree.

17. An apparatus for searching and modifying a source code of a computer program written in a programming language for controlling operation of a computer, comprising:

memory including a first storage, a second storage, a third storage and a fourth storage;

a compiler for translating said source code program stored in said first storage into a parsed representation of said source code program and storing said parsed representation in said second storage;

means for traversing said parsed representation;

said third storage storing a search term including a searched for symbol; and means for applying said search term to said parsed representation using said means for traversing;

means for identifying an occurrences of a first program symbol equal to said searched for symbol in said parsed representation;

said fourth storage storing a parse tree program including one or more new program symbols and instructional information for processing said parsed representation;

said means for traversing said parsed representation generating a new source code from said parsed representation and applying said parse tree program to said parsed representation upon recognition of one of said occurrences of said first program symbol under control of said instructional information;

thereby generating a new source code including said first program term at locations defined in said listing of said first locations and said instructional information.

18. An apparatus for searching and modifying a source code of a computer program written in an application program language for controlling operation of a computer, comprising:

a memory including a first storage, a second storage, a third storage, and a fourth storage;

said first storage storing said source code;

a compiler for translating said source code into a parsed representation of said source code and storing said parsed representation in said second storage;

first means for traversing said parsed representation;

said third storage storing a search term including at least one searched for symbol;

said first means for traversing including means for applying said search term to said parsed representation, and means for identifying occurrences and first locations of first program symbols equal to said searched for symbol in said parsed representation; and said fourth storage storing said first locations, whereby a listing is established of the occurrences and said first locations of said first program symbols in said parsed representation.

19. An apparatus for searching and modifying a source code of a computer program written in a application program language for controlling operation of a computer, comprising:

a memory including a first storage, a second storage, third storage, and a fourth storage;

said first storage storing said source code;

a compiler for translating said source code into a parsed representation of said source code and storing said parsed representation in said second storage;

first means for traversing said parsed representation;

said third storage storing a search term including at least one searched for symbol;

said first means for traversing including means for applying said search term to said parsed representation, and means for identifying occurrences and first locations of first program symbols equal to said searched for symbol in said parsed representation; and said fourth storage storing said first locations, whereby a listing is established of the occurrences and said first locations of said first program symbols in said parsed representation.

20. An apparatus for searching and modifying a source code of a computer application program written in an application program language for controlling operation of a computer, wherein said application program describes a design of an engineered object, said engineering object including sub-assemblies, said design being structured in multi-level sections, each of said sections including information of one of said sub-assemblies of said object;

wherein said means for traversing includes means for applying said search term to said section and means for applying said search term to said information of said sub-assemblies;

said apparatus comprising:
a memory including a first storage, a second storage, a third storage, and a fourth storage;

said first storage storing said source code of said application program;

a compiler for translating said source code into a parsed representation of said source code and storing said parsed representation in said second storage;

first means for traversing said parsed representation;

said third storage storing a search term including at least one searched for symbol;

said first means for traversing including means for applying said search term to said parsed representation, and means for identifying occurrences and first locations of first program symbols equal to said searched for symbol in said parsed representation; and said fourth storage storing said first locations, whereby a listing is established of the occurrences and said first locations of said first program symbols in said parsed representation;

said apparatus providing a fast access to search term defined information in said application program.

* * * * *